US011407855B2

United States Patent
Guironnet et al.

(10) Patent No.: US 11,407,855 B2
(45) Date of Patent: Aug. 9, 2022

(54) RING OPENING POLYMERIZATION IN AN AQUEOUS DISPERSION

(71) Applicant: The Board of Trustees of the University of Illinois, Urbana, IL (US)

(72) Inventors: Damien S. Guironnet, Urbana, IL (US); Danielle Harrier, Urbana, IL (US); Paul Kenis, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 2 days.

(21) Appl. No.: 16/997,296

(22) Filed: Aug. 19, 2020

(65) Prior Publication Data
US 2021/0054139 A1 Feb. 25, 2021

Related U.S. Application Data

(60) Provisional application No. 62/891,000, filed on Aug. 23, 2019.

(51) Int. Cl.
*C08G 63/08* (2006.01)

(52) U.S. Cl.
CPC .................................. *C08G 63/08* (2013.01)

(58) Field of Classification Search
USPC ................................ 528/355, 302, 354, 357
See application file for complete search history.

(56) References Cited

U.S. PATENT DOCUMENTS

| | | |
|---|---|---|
| 6,455,219 B1 | 9/2002 | Chen et al. |
| 6,727,203 B2 * | 4/2004 | Ichikawa ............... B01J 13/06 424/423 |
| 6,762,240 B2 | 7/2004 | Swarup et al. |
| 6,992,156 B2 | 1/2006 | Parker et al. |
| 8,466,133 B2 | 6/2013 | Moller et al. |
| 9,181,448 B2 | 11/2015 | Li et al. |

OTHER PUBLICATIONS

Boucher-Jacobs et al., "Encapsulation of Catalyst in Block Copolymer Micelles for the Polymerization of Ethylene in Aqueous Medium," Nature Comm., 9(841):1-9, Feb. 2018.
Dorresteijn et al., "Poly( L-lactide) Nanoparticles via Ring-Opening Polymerization in Non-aqueous Emulsion," Macromol Chem Phys., 213:1996-2002, Aug. 2012.
Karnik et al., "Microfluidic Platform for Controlled Synthesis of Polymeric Nanoparticles," Nano Lett., 8(9):2906-2912, Jul. 2008.
Mecking et al., "Aqueous Catalytic Polymerization of Olefins," Angew Chem Int. Ed., 41:544-561, Feb. 2002.
Mecking, "Polymer Dispersions From Catalytic Polymerization in Aqueous Systems," Colloid Polym Sci., 285:605-619, Mar. 2007.
Mecking, Chap. 7.2 State-of-the-Art, Multiphase Homogeneous Catalysis, Wiley-VCH Verlag GmbH & Co. KGaA , pp. 763-764, Aug. 2005.
Shah et al., "Designer Emulsions Using Microfluidics," Mater Today, 11(4):18-27, Apr. 2008.
Stutman et al., "Mechanism of Core/Shell Emulsion Polymerization," Ind Eng Chem Prod Res Dev., 24:404-412, Sep. 1985.
Teh et al., "Droplet Microfluidics," Lab Chip, 8(2):198-220, Jan. 2008.
Walsh et al., "Recent Trends in Catalytic Polymerizations," ACS Catal., 9:11153-11188, Nov. 2019.
Zhu et al., "Passive and Active Droplet Generation With Microfluidics: A Review," Lab Chip, 17(1):34-75, Feb. 2017.

* cited by examiner

*Primary Examiner* — Terressa Boykin
(74) *Attorney, Agent, or Firm* — Haukaas Fortius PLLC; Michael H. Haukaas

(57) ABSTRACT

We have developed a ring opening polymerization method in an aqueous dispersion for the formation of latex. By encapsulating a catalyst in micelles dispersed in water, a seeded catalytic polymerization of various monomers in water was successfully performed. An amphiphilic molecule was used to form a micelle with a hydrophobic core in water. The catalyst that was encapsulated within this structure and the formed microcapsules were used as microreactors for the formation of biodegradable elastomers.

24 Claims, 12 Drawing Sheets

(A) Dripping Regime (B) Jetting Regime

RING OPENING POLYMERIZATION IN AN AQUEOUS DISPERSION

RELATED APPLICATIONS

This application claims priority under 35 U.S.C. § 119(e) to U.S. Provisional Patent Application No. 62/891,000, filed Aug. 23, 2019, which is incorporated herein by reference.

GOVERNMENT SUPPORT

This invention was made with government support under Grant No. 1706911 awarded by the National Science Foundation. The government has certain rights in the invention.

BACKGROUND OF THE INVENTION

The quest for biodegradable polymers has gained momentum over the past decades, motivated by an alarming accumulation of plastics in landfills and oceans. Despite the successful commercialization of many biodegradable thermoplastics targeted at substituting non-degradable polymer, to date no alternative to widely used synthetic and non-biodegradable polymer latexes have been developed. A polymer latex is characterized by polymer nanoparticles stabilized by amphiphilic emulsifiers dispersed in an aqueous phase. They account for 10% of the global annual polymer production and are traditionally synthesized through an emulsion polymerization process. Polymer latex applications range from coatings, adhesives, and drug delivery carriers. With such a vast range of products, the development of a technique to produce biodegradable polymer latexes would provide a unique opportunity to enhance the sustainability of the polymer industry.

Biodegradable polymers and polymer latexes both possess excellent tunability in fabrication, but they have remained autonomous of one another due to the incompatibility of the polymerization method used to synthesize biodegradable polymers with water. Most biodegradable polymers are synthesized through a catalytic ring-opening polymerization (ROP) of aliphatic cyclic esters. The ester bond in the repeating unit makes the polymer susceptible to biological and hydrolytic degradation conferring its biodegradability. In industry, the ROP is traditionally performed under moderately anhydrous conditions as water can both deactivate the catalyst and act as an initiator; thus excess water severely limits the attainable molecular weight. In academia, despite the plethora of novel catalysts being developed, most new catalysts are presumed to be quickly and quantitatively deactivated by water, and thus are used under purely anhydrous conditions. This water reactivity has thus far categorically prevented the implementation of ROP in an aqueous environment, which would be essential for emulsion polymerization.

Miniemulsion polymerization has been successfully implemented for catalytic polymerizations using catalysts that are moderately compatible with water. The anionic ROP of high ring strain epoxides has been successfully performed using this technique, however, the high water content limits the molecular weight of the polymer produced ($M_n \leq 730$ g mol$^{-1}$). In the miniemulsion process, the catalyst and the monomer are combined with a hydrophobic solvent, and the mixture is dispersed into nanodroplets stabilized by a large amount of surfactant using high shear. The polymerization proceeds independently in each droplet to yield the desired nanoparticle dispersion. During the emulsification process, the catalyst/initiator is exposed to both water, which leads to deactivation, and to the monomer, which initiates polymerization. Consequentially, the catalyst needs to be water-compatible and the polymerization needs to remain slow or completely stalled during the emulsification phase. For the ROP of cyclic esters, these two requirements have not been met to date, making it incompatible with the miniemulsion process. This limitation, as well as the vast potential for applications of biodegradable polymer latexes, motivated us to develop an alternative encapsulation strategy for performing the ROP in the presence of water.

Accordingly, making emulsion polymerization suitable for the sustainable production of various polymers is needed to provide biodegradable products that would decrease pollution related to accumulation of non-biodegradable polymers in landfills.

SUMMARY

Our approach consists of utilizing a microfluidic encapsulation strategy where the dispersed phase, comprised of a monomer and a catalyst solution, is fed into a narrow tube to initiate polymerization, before meeting the immiscible continuous aqueous phase at a junction to form micrometer size droplets, FIG. 1. The catalyst and monomer solutions are initially supplied from different syringes to prevent premature polymerization before entering the droplet-generating device. The polymerization starts once the catalyst and monomer solutions come in contact and will continue within the droplet until water diffuses throughout the droplet and completely deactivates the catalyst. By design, the catalyst is supplied between the monomer streams to retain the catalyst in the core of the droplets, which is thought to provide more time for the catalyst to remain active before water quenches the polymerization. Water diffusion into the droplet directly limits the polymerization time. Therefore, this approach requires a fast ROP for the polymerization to produce a high molecular weight polymer before water completely deactivates the catalyst.

Described herein is the engineering of a droplet based microfluidic device that facilitates encapsulation of the water sensitive catalyst, and allows, for the first time, ROP of synthetic biodegradable linear and partially crosslinked polymers in an aqueous dispersion. Our approach relies on the understanding of fluid mechanics, precise formulation of the polymerization solution, and control over ROP kinetics within the device and the subsequent droplets.

Accordingly, this disclosure provides a droplet microreactor comprising:

a) an amphiphilic molecule;

b) a hydrophobic carrier comprising a mono-lactone monomer and an oil, nonpolar solvent, or combination thereof; and c) a homogenous solution comprising a polymerization catalyst, initiator, and a second solvent; and d) an aqueous solution;

wherein the amphiphilic molecule and the hydrophobic carrier form a droplet microreactor having a hydrophobic interior and a hydrophilic exterior;

wherein the hydrophobic interior of the droplet microreactor comprises the homogeneous solution and the hydrophilic exterior is ensheathed in the aqueous solution.

Additionally, this disclosure provides a system for forming the droplet microreactor as described above, the system comprising:
a) the amphiphilic molecule;
b) the hydrophobic carrier comprising the mono-lactone monomer and the oil, nonpolar solvent, or combination thereof;
c) the homogenous solution comprising the polymerization catalyst, initiator, and second solvent; and
d) a microfluidic device configured for laminar flow of a fluid comprising the homogeneous solution and of a mixture of the amphiphilic molecule and the hydrophobic carrier, wherein the homogenous solution flows coaxially at the center of the mixture;
wherein the microfluidic device comprises an inlet for a stream of an aqueous solution that ensheaths the fluid and forms uniform microdroplets of the droplet microreactor.

Also, this disclosure provides a method for ring-opening polymerization (ROP) in an aqueous dispersion comprising:
a) contacting an amphiphilic molecule, a mono-lactone monomer capable of ring-opening polymerization, and a hydrophobic carrier to form a mixture;
b) contacting an organic polymerization catalyst, initiator, and a solvent to form a homogeneous solution;
c) feeding the homogeneous solution into at least one first inlet of a microfluidic device and feeding the mixture into at least one second inlet of the microfluidic device wherein the microfluidic device configured for laminar flow of a fluid, the fluid comprising the homogeneous solution fed from the at least one first inlet and the mixture fed from the at least one second inlet, wherein the homogenous solution flows coaxially at the center of the mixture; and
d) forming a stream of an aqueous solution from at least one third inlet of the microfluidic device wherein the aqueous solution ensheaths the fluid to form uniform microdroplets of a droplet microreactor;
wherein the amphiphilic molecule and the hydrophobic carrier form the droplet microreactor having a hydrophobic interior and a hydrophilic exterior;
wherein the hydrophobic interior of the droplet microreactor comprises the homogeneous solution and the hydrophilic exterior is ensheathed in the aqueous solution;
wherein the mono-lactone monomer and aqueous solution diffuse into the homogeneous solution at the hydrophobic interior of the droplet microreactor to form a latex via ROP in an aqueous dispersion.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
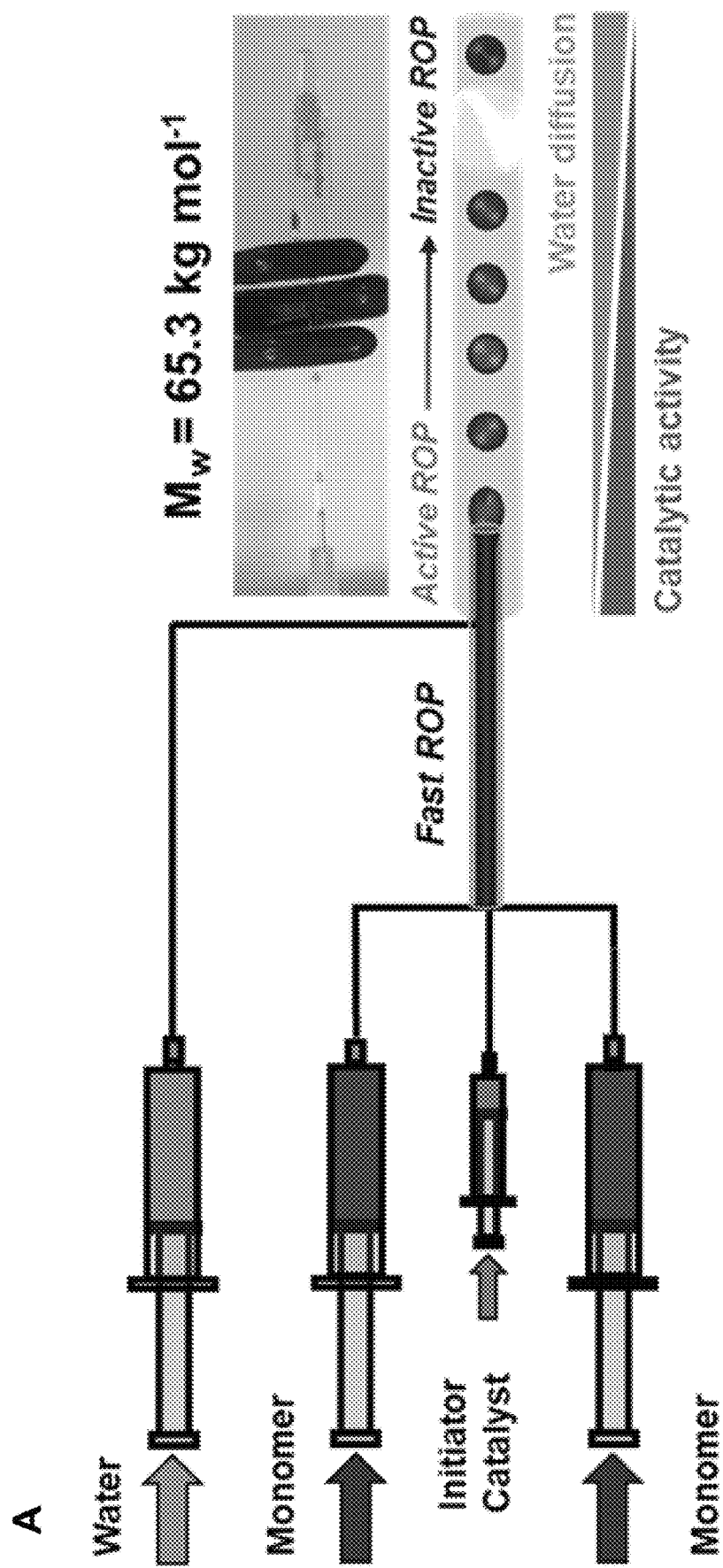
FIG. 1. (A) Droplet microfluidic encapsulation of water sensitive ring-opening polymerization catalyst. The combination of the fast polymerization and the controlled encapsulation of the catalyst allows the catalyst enough time to polymerize before water diffusion into the droplet can quench the reaction. (B) Cross-section of water sensitive catalyst encapsulation with block copolymer, where the polymerization takes place.
Figure 1:
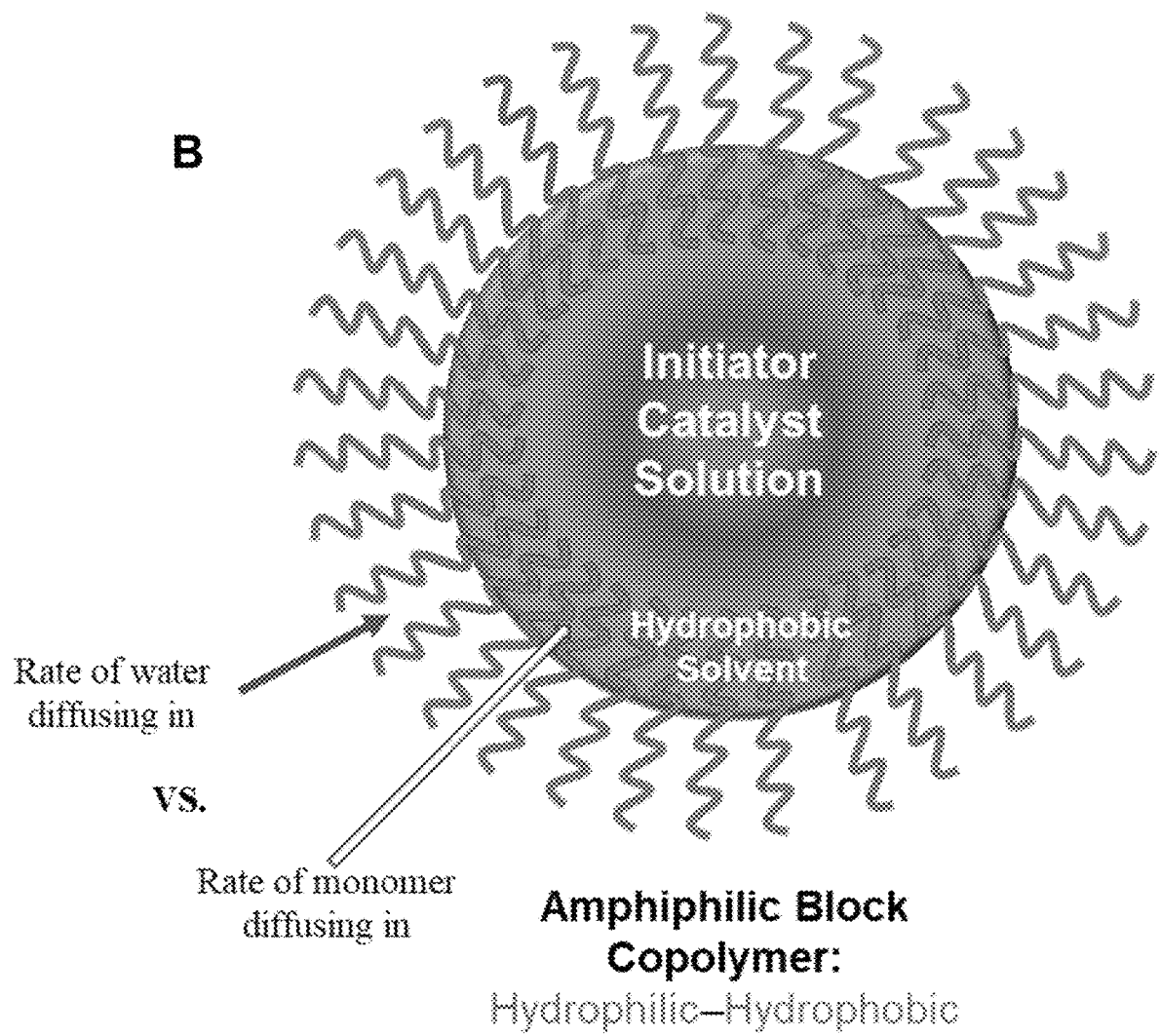

Aqueous polymer dispersions are commodity materials produced on a multi-million-ton scale annually. Today none of these materials are biodegradable because the process by which they are made is not compatible with the synthesis of biodegradable polymers. Herein we report a droplet microfluidic encapsulation strategy for protecting a water incompatible ring-opening polymerization (ROP) catalyst from the aqueous phase, yielding biodegradable polymer particles dispersed in water. Polymerization yields 300 μm sized particles comprised of biodegradable poly(δ-valerolactone) with molecular weights up to 19.5 kg mol$^{-1}$. The success of this approach relies on simultaneous precise control of the kinetics of polymerization, the rate of mass transfer rates, and fluid mechanics. The power of this methodology was demonstrated through the synthesis of crosslinked polymer particles through the copolymerization of bis(ε-caprolactone-4-yl)propane and δ-valerolactone, producing crosslinked polymer particles with molecular weights reaching 65.3 kg mol$^{-1}$. Overall, this encapsulation technique opens the door for the synthesis of biodegradable polymer latex and processable, biodegradable elastomers.

A non-exhaustive overview of some monomers and biodegradable polymers comprising carbonyl moieties is shown in Table 1.

may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

TABLE 1

Monomers and biodegradable polymers

| Monomers | Polymers | Polymerization |
|---|---|---|
| | PET | Polycondensation |
| | PHA | |
| | Polyesters | |
| | PLA | Chain-growth ring opening polymerization |
| | PCL | |
| | Polycarbonates | |

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about."

These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983);

As used herein, the term "substituted" or "substituent" is intended to indicate that one or more (for example, 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms.

The term "cycloalkyl" refers to cyclic alkyl groups of, for example, from 3 to 10 carbon atoms having a single cyclic ring or multiple condensed rings.

The term "aryl" refers to an aromatic hydrocarbon group derived from the removal of at least one hydrogen atom from a single carbon atom of a parent aromatic ring system. The aryl group can have a single ring (e.g., phenyl) or multiple condensed (fused) rings. The aryl can be unsubstituted or optionally substituted.

A "solvent" as described herein can include water or an organic solvent. Examples of organic solvents include hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), N,N-dimethylacetamide (DMA), and dimethyl sulfoxide (DMSO). Solvents may be used alone or two or more of them may be mixed for use to provide a "solvent system".

The phrase "one or more" is readily understood by one of skill in the art, particularly when read in context of its usage. For example, one or more substituents on a phenyl ring refers to one to five, or one to up to four, for example if the phenyl ring is disubstituted. One or more subunits (i.e., repeat units or blocks) of a polymer can refer to about 5 to about 100,000, or any number of subunits.

Substituents of the compounds and polymers described herein may be present to a recursive degree. In this context, "recursive substituent" means that a substituent may recite another instance of itself. Because of the recursive nature of such substituents, theoretically, a large number may be present in any given claim. One of ordinary skill in the art of organic chemistry understands that the total number of such substituents is reasonably limited by the desired properties of the compound intended. Such properties include, by of example and not limitation, physical properties such as molecular weight, solubility or log P, application properties such as activity against the intended target, and practical properties such as ease of synthesis. Recursive substituents are an intended aspect of the invention. One of ordinary skill in the art of organic chemistry understands the versatility of such substituents. To the degree that recursive substituents are present in a claim of the invention, the total number in the repeating unit of a polymer example can be, for example, about 1-50, about 1-40, about 1-30, about 1-20, about 1-10, or about 1-5.

The term, "repeat unit", "repeating unit", or "block" as used herein refers to the moiety of a polymer that is repetitive. The repeat unit may comprise one or more repeat units, labeled as, for example, repeat unit A, repeat unit B, repeat unit C, etc. Repeat units A-C, for example, may be covalently bound together to form a combined repeat unit. Monomers or a combination of one or more different monomers can be combined to form a (combined) repeat unit of a polymer or copolymer.

The term "molecular weight" for the copolymers disclosed herein refers to the average number molecular weight (Mn). The corresponding weight average molecular weight (Mw) can be determined from other disclosed parameters by methods (e.g., by calculation) known to the skilled artisan.

The copolymers disclosed herein can comprise random or block copolymers. A copolymer that is random copolymer would be indicated as such by the "r" over the bond between the units of the copolymer.

In various embodiments, the ends of the copolymer (i.e., the initiator end or terminal end), is a low molecular weight moiety (e.g. under 500 Da), such as, H, OH, OOH, $CH_2OH$, CN, $NH_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer.

The term "amphiphilic molecule" or "amphiphile" refers to a chemical compound possessing both hydrophilic (water-loving, polar) and lipophilic (fat-loving) properties. For example, the amphiphile can be a surfactant, a polymer, or a block copolymer that has amphiphilic properties.

Embodiments of the Invention

This disclosure provides a droplet microreactor comprising:
a) an amphiphilic molecule;
b) a hydrophobic carrier comprising a mono-lactone monomer and an oil, nonpolar solvent, or combination thereof; and
c) a homogenous solution comprising a polymerization catalyst, initiator, and a second solvent; and
d) an aqueous solution;
wherein the amphiphilic molecule and the hydrophobic carrier form a droplet microreactor having a hydrophobic interior and a hydrophilic exterior;
wherein the hydrophobic interior of the droplet microreactor comprises the homogeneous solution and the hydrophilic exterior is ensheathed in the aqueous solution.

In some embodiments, the droplet microreactor is cylindrical (e.g. tube-shaped) or spherical (e.g., droplet shaped) (see FIG. 1b). In various embodiments, the mono-lactone monomer is represented by Formula I:

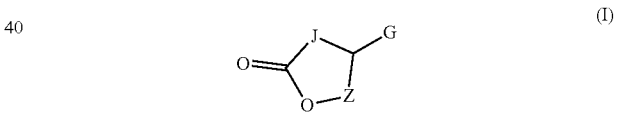

wherein
G is H or $CR^1R^2R^3$ wherein $R^1$, $R^2$ and $R^3$ are each independently H or $(C_1-C_6)$alkyl;
J is $(C_0-C_4)$alkylene; and
Z is $(C_0-C_4)$alkylene.

In some embodiments, the mono-lactone monomer is a lactide, ε-caprolactone, δ-valerolactone, each monomer which may be further substituted with one or more alkyl groups.

In various embodiments, the microreactor further comprises a cross-linking monomer. In some embodiments, the cross-linking monomer is a bis-lactone (dilactone) monomer. In yet other various embodiments, the bis-lactone monomer is represented by Formula II:

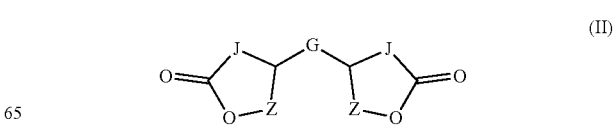

wherein G is $C_{0-1}R^1R^2$ wherein $R^1$ and $R^2$ are each independently H or $(C_1$-$C_6)$alkyl when G is $C_1R^1R^2$; J is $(C_0$-$C_4)$alkylene; and Z is $(C_0$-$C_4)$alkylene.

In other embodiments the bis-lactone is:

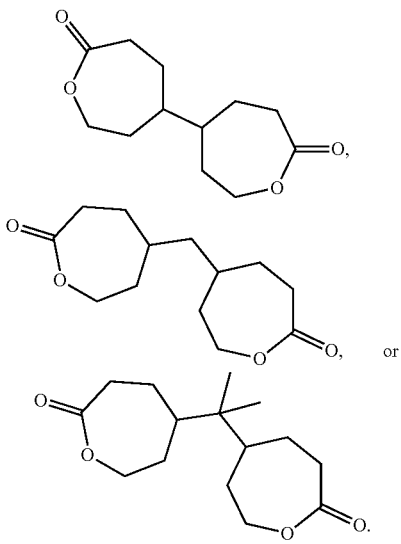

In additional embodiments the concentration of the mono-lactone or bis-lactone is about 1 mol $L^{-1}$, about 2 mol $L^{-1}$, about 2.5 mol $L^{-1}$, about 3 mol $L^{-1}$, about 3.5 mol $L^{-1}$, about 4 mol $L^{-1}$, or about 5 mol $L^{-1}$. In some embodiments, the polymerization catalyst is a small molecule organic polymerization catalyst. In other embodiments, the polymerization catalyst is an organometallic polymerization catalyst. In other embodiments, the organic polymerization catalyst comprises a urea moiety. In additional embodiments, the polymerization catalyst is an organic polymerization catalyst consisting of a urea moiety. In one embodiment the urea is a 1,3-diphenyl urea.

In various additional embodiments the amphiphilic molecule is a commercially available surfactant. In some embodiments, the system comprises one or more surfactants. In some other embodiments the amphiphilic molecule is a block copolymer.

In other embodiments, the initiator is an alcohol or alkoxide. In further embodiments, the alcohol is a $(C_1$-$C_{20})$ alkanol. In other embodiments, the alkoxide is a $(C_1$-$C_{20})$ alkoxide. In some embodiments, the counter ion of the $(C_1$-$C_{20})$alkoxide is lithium, sodium or potassium.

In additional embodiments, the second solvent is an organic solvent. The organic solvent can be polar or nonpolar. In other embodiments, the second solvent comprises a protic or non-protic solvent. In further embodiments, the second solvent comprises a polar aprotic solvent. In some embodiments, the organic solvent is an ether or a cyclic ether. In other embodiments, the second solvent is tetrahydrofuran, toluene, or a combination thereof. In some embodiments, the nonpolar solvent is toluene, xylene or a $(C_5$-$C{is})$alkane. In other embodiments, the non-polar solvent is an oil, mineral oil or soybean oil.

In yet other embodiments, the diameter of the microreactor is about 10 nanometers to about 500 micrometers. In other embodiments the diameter is about 1 micrometer to about 1000 micrometers. The diameter can also be about 50 micrometers, about 100 micrometers, about 150 micrometers, about 200 micrometers, about 250 micrometers, about 300 micrometers, about 350 micrometers, about 400 micrometers, about 450 micrometers, or any diameter between any of said diameters.

In additional embodiments, the microreactor further comprising channels extending from the hydrophobic interior to the hydrophilic exterior of the microreactor. In some embodiments, the channels comprise polymers or block copolymers. In other embodiments, the channels have a diameter sufficiently wide for the mono-lactone monomer to traverse through the channels, wherein the mono-lactone monomer has a molecular weight of less than 200 Daltons, or less than 500 Daltons. In some embodiments, the small molecule has a molecular weight of about 18 Daltons to about 200 Daltons.

This disclosure also provides a system for forming the droplet microreactor described above, comprising:
  a) the amphiphilic molecule;
  b) the hydrophobic carrier comprising the mono-lactone monomer and the oil, nonpolar solvent, or combination thereof;
  c) the homogenous solution comprising the polymerization catalyst, initiator, and second solvent; and
  d) a microfluidic device configured for laminar flow of a fluid comprising the homogeneous solution and of a mixture of the amphiphilic molecule and the hydrophobic carrier, wherein the homogenous solution flows coaxially at the center of the mixture;
wherein the microfluidic device comprises an inlet for a stream of an aqueous solution that ensheaths the fluid and forms uniform microdroplets of the droplet microreactor.

In various embodiments, uniform microdroplets have substantially similar size, diameter, dimensions, shape, physical properties, layers, consistency, composition, distribution, or any combination thereof.

In various embodiments, the microreactor further comprises a cross-linking monomer. In other embodiments, the microfluidic device comprises flow control valves capable of individually controlling laminar flow velocity of the mixture, homogenous solution, and aqueous solution. In additional embodiments, the microfluidic device comprises a tube for laminar flow of the fluid wherein the tube has a diameter suitable for forming uniform microdroplets of the droplet microreactor.

Additionally, this disclosure provides a method for ring-opening polymerization (ROP) in an aqueous dispersion comprising:
  a) contacting an amphiphilic molecule, a mono-lactone monomer capable of ring-opening polymerization, and a hydrophobic carrier to form a mixture;
  b) contacting an organic polymerization catalyst, initiator, and a solvent to form a homogeneous solution;
  c) feeding the homogeneous solution into at least one first inlet of a microfluidic device and feeding the mixture into at least one second inlet of the microfluidic device wherein the microfluidic device configured for laminar flow of a fluid, the fluid comprising the homogeneous solution fed from the at least one first inlet and the mixture fed from the at least one second inlet, wherein the homogenous solution flows coaxially at the center of the mixture; and
  d) forming a stream of an aqueous solution from at least one third inlet of the microfluidic device wherein the aqueous solution ensheaths the fluid to form uniform microdroplets of a droplet microreactor;
wherein the amphiphilic molecule and the hydrophobic carrier form the droplet microreactor having a hydrophobic interior and a hydrophilic exterior;

wherein the hydrophobic interior of the droplet microreactor comprises the homogeneous solution and the hydrophilic exterior is ensheathed in the aqueous solution;

wherein the mono-lactone monomer and aqueous solution diffuse into the homogeneous solution at the hydrophobic interior of the droplet microreactor to form a latex via ROP in an aqueous dispersion.

In some embodiments, the microfluidic device comprises a tube for laminar flow of the fluid wherein the tube has a diameter suitable for forming uniform microdroplets of the droplet microreactor. In other embodiments, the tube has and internal diameter of about 50 μm to about 500 μm, about 100 μm to about 300 μm, or about 150 μm to about 200 μm.

In other embodiments, the hydrophobic carrier comprises an oil, nonpolar solvent, or combination thereof. In other embodiments, the hydrophobic carrier further comprises a mono-lactone monomer, a cross-linking monomer, or a combination thereof. In other embodiments, the aqueous solution further comprises a mono-lactone monomer, a cross-linking monomer, or a combination thereof. In some embodiments, the aqueous solution is water. In some other embodiments the aqueous solution comprises a surfactant, buffer, or combination thereof.

In yet other embodiments, the mono-lactone monomer diffuses into the homogeneous solution at a rate faster than the aqueous solution. In additional embodiments, the aqueous solution diffuses into the homogeneous solution at a rate slower than the rate of ROP. In some other embodiments, the homogeneous solution, mixture, and aqueous solution each have a flow rate that can be individually varied via a control valve to change the diameter of the uniform microdroplets, the molecular weight of the latex, or a combination thereof.

In various other embodiments, the fluid has a first flow rate (fr) and the aqueous solution has a second flow rate (ar) and the ratio fr:ar is about 1:3 to about 1:5. In other embodiments, the ratio fr:ar is about 1:1 to about 1:10, about 1:2 to about 1:8, or about 1:4. In other embodiments, the microreactor further comprises a crosslinking bis-lactone monomer.

In yet other embodiments, the formed latex is a biodegradable elastomer. In other various embodiments, the latex is a biodegradable polyhydroxyalkanoate. In further embodiments, performing the ROP is at a temperature of about –30° C. to about 120° C. In other embodiments the ROP reaction temperature is about 30° C. to about 90° C. In some other embodiments, performing the ROP is at a pressure of about 1 atm to about 10 atm. In other embodiments, the ROP is at a pressure of about 1 atm to about 5 atm.

In further embodiments, a lower first flow rate, lower second flow rate, or combination thereof increases the molecular weight of the latex relative to the corresponding higher first flow rate, higher second flow rate, or combination thereof. In some embodiments, the number average molecular weight of the polymer formed is greater than is greater than 5 kg/mol or greater than about 15 kg/mol, greater than about 50 kg/mol, or greater than about 100 kg/mole. In other embodiments, the number average molecular weight of the polymer formed is about 15 kg/mol to about 500 kg/mol, about 25 kg/mol to about 250 kg/mol, or about 50 kg/mol to about 150 kg/mol.

Results and Discussion

ROP Chemistry Selection. The primary constraint for the success of the encapsulation approach is the selection of a catalyst system that provides a high rate of polymerization, as the time for the polymerization to achieve completion before water diffuses throughout the droplet and deactivates the catalyst is finite. We opted to implement urea organocatalyzed ROP of cyclic esters, because this family of catalysts is known to exhibit fast kinetics and high selectivity, Scheme 1 (Chem. Rev. 2007, 107 (12), 5813).

Scheme 1. Urea anion catalysts for the ring-opening polymerization of δ-valerolactone and ε-caprolactone.

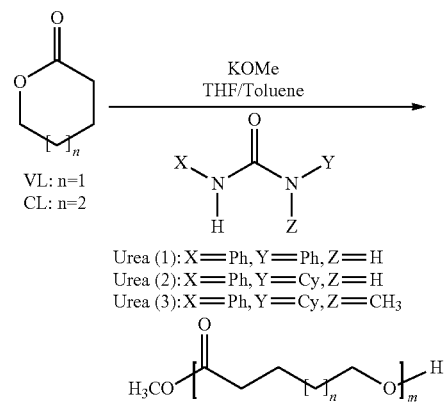

We opted to use δ-valerolactone (VL) and ε-caprolactone (CL) as our monomers for two reasons. First, they yield biodegradable polymers, and second, they are liquid at room temperature, which allows for the preparation of highly concentrated monomer droplets. At concentrations greater than 3 mol $L^{-1}$, a slight increase of the polymer dispersity and viscosity was observed in batch polymerizations. To avoid pressure build up or even clogging in the small diameter tubing due to the high viscosity of the neat solution, we chose to operate at a monomer concentration of 3 mol $L^{-1}$ for all subsequent reactions in the flow system. Similarly, the catalyst/initiator solution was made as concentrated as possible; however, the solubility of the initiator, potassium methoxide (KOMe), is highly influenced by the ratio of the catalyst to initiator. Urea (1) and Urea (2) could be solubilized with a ratio of initiator:catalyst:monomer of 1:3:200, while Urea (3) needed a 1:4:200 ratio. The high solubility of the catalyst and initiator is preferred in order to minimize the amount of organic solvent as it remains in the final product.

Figure 6:
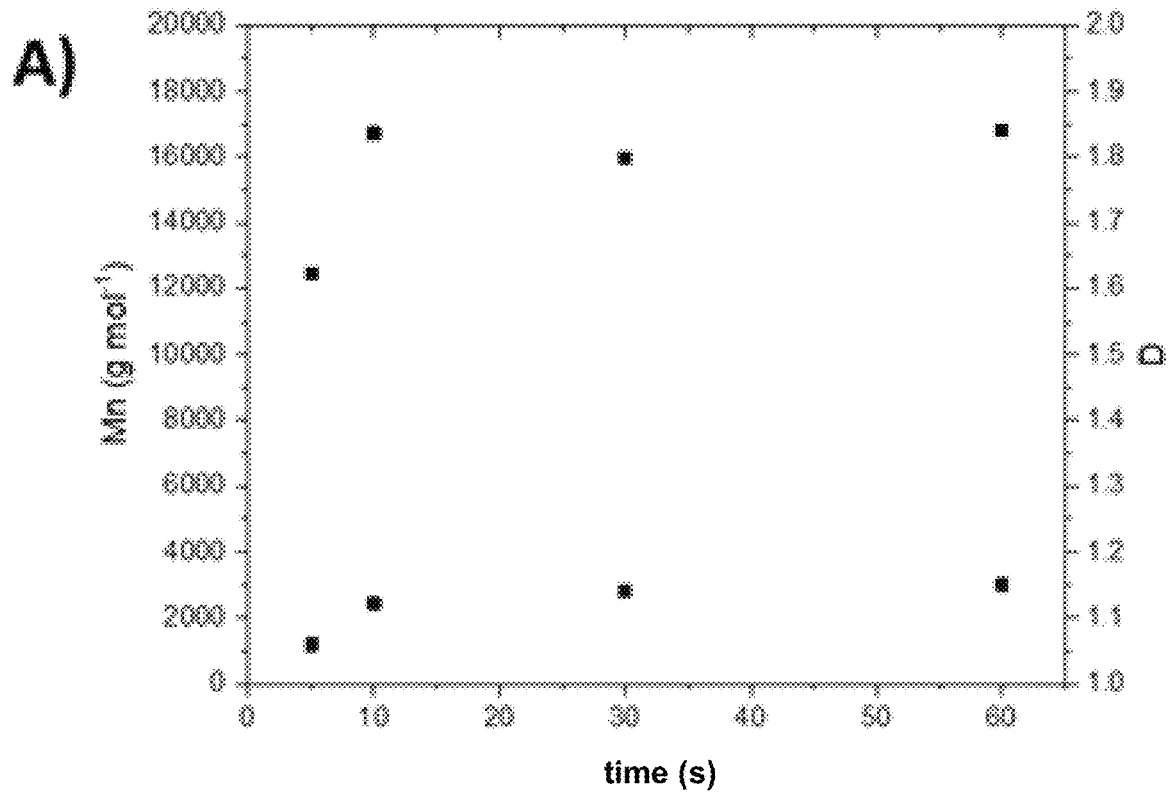
FIG. 6. Results from batch experiments comparing the three catalysts rate of polymerization of VL. A) Urea 1 B) Urea 2 C) Urea 3. Room temperature. Stir plate at 800 rpm. Quenched with benzoic acid. Initiator:Catalyst:Monomer. Urea (1) 1:3:200. Urea (2) 1:3:200. Urea (3) 1:4:200.
Figure 6:
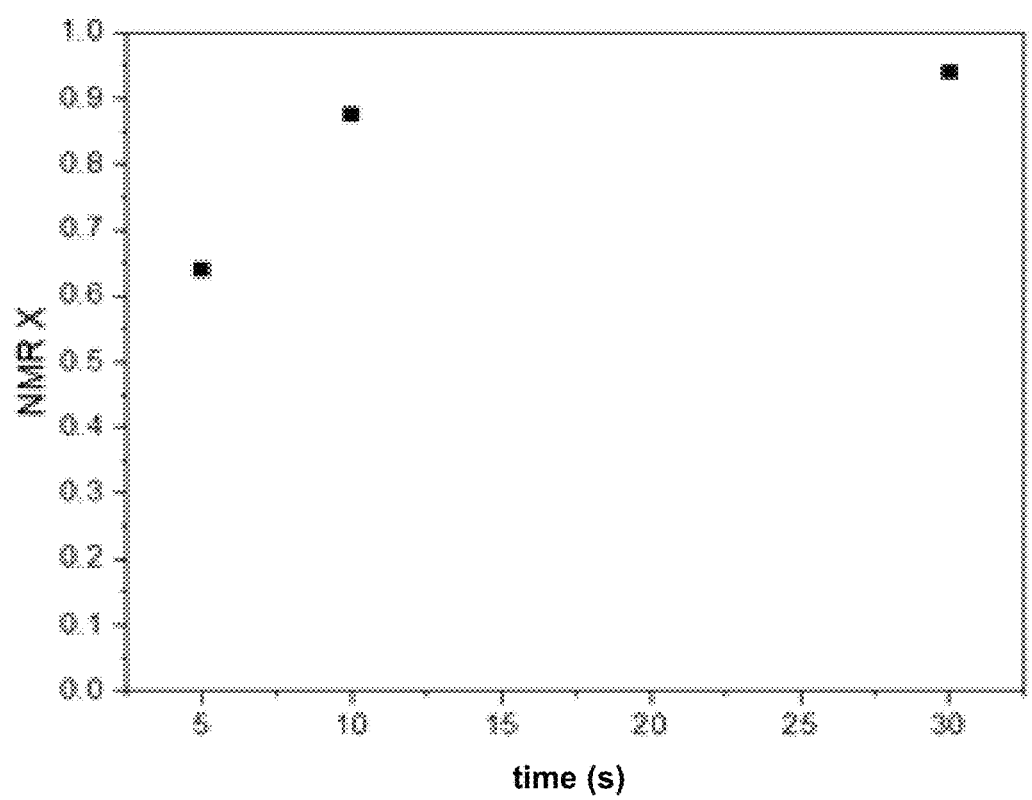
Figure 6:
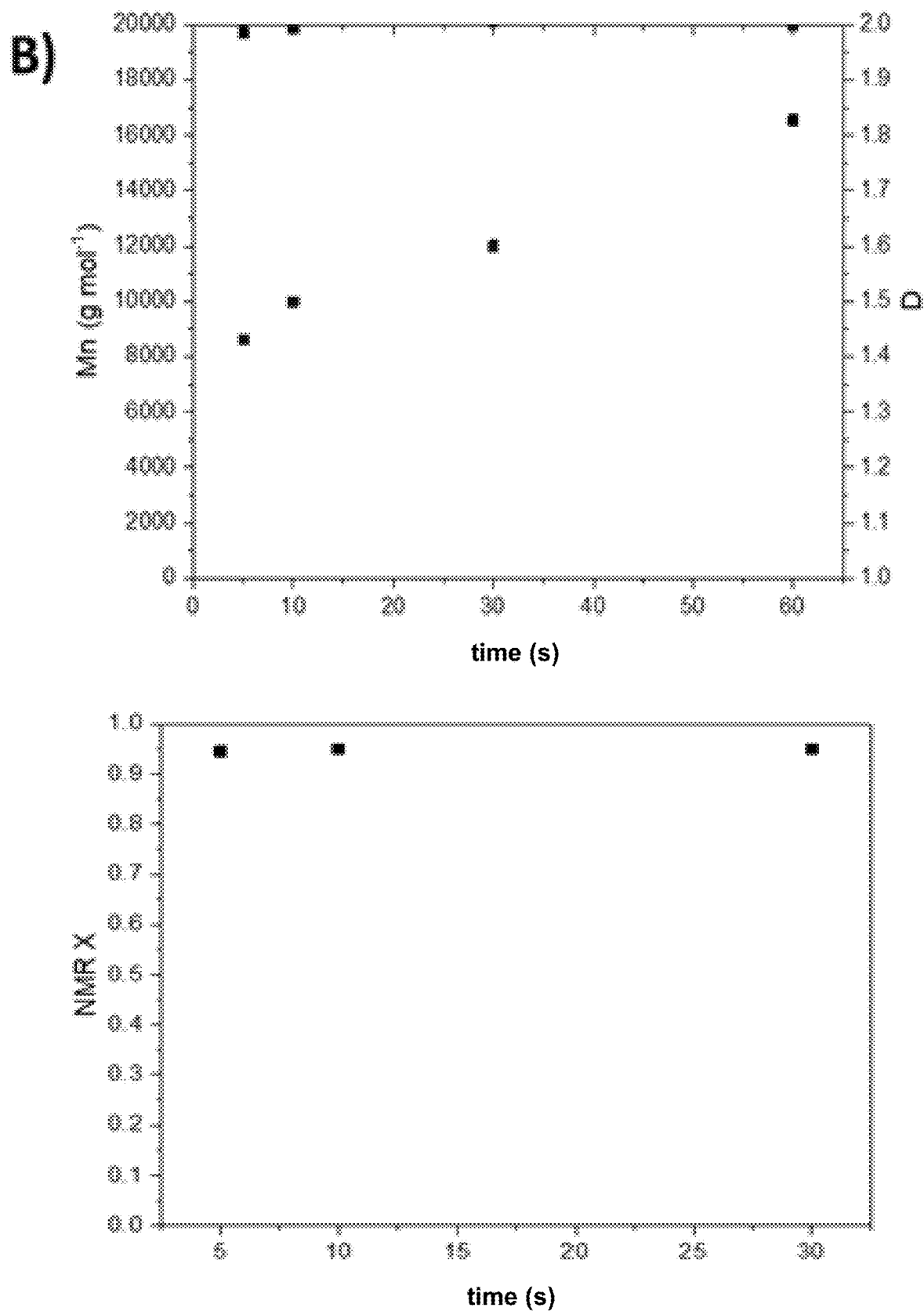
Figure 6:
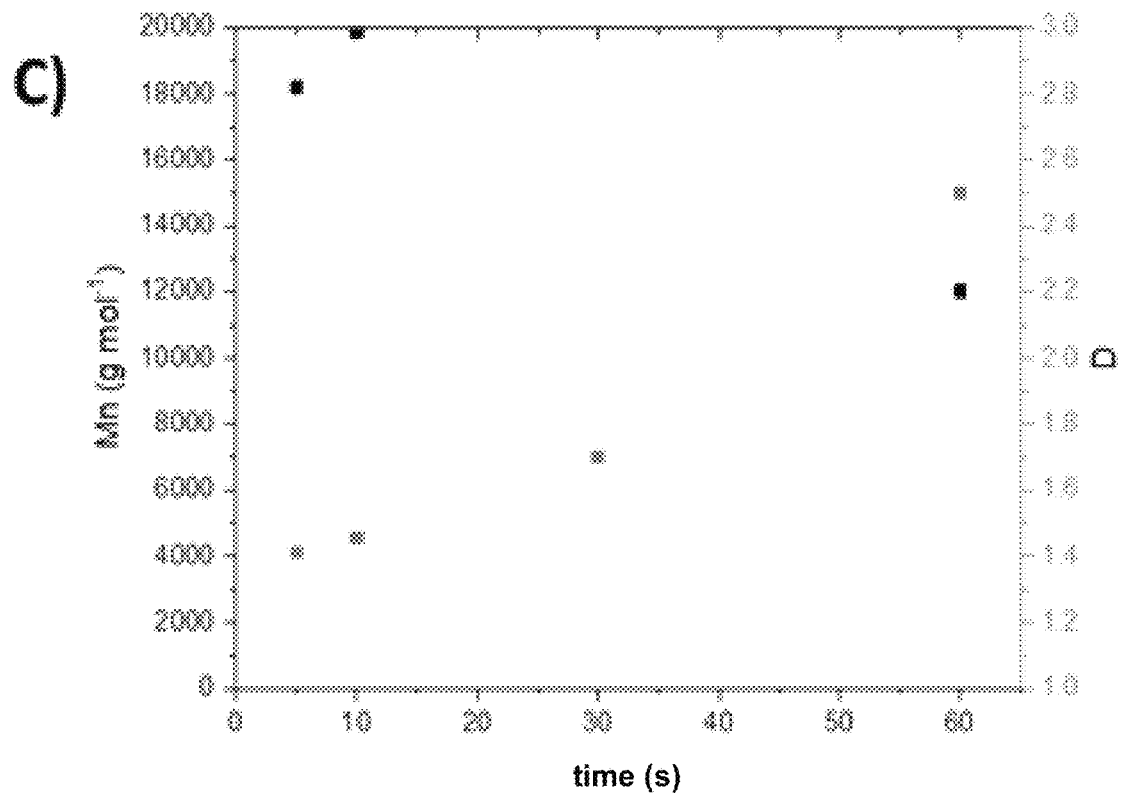
Figure 6:
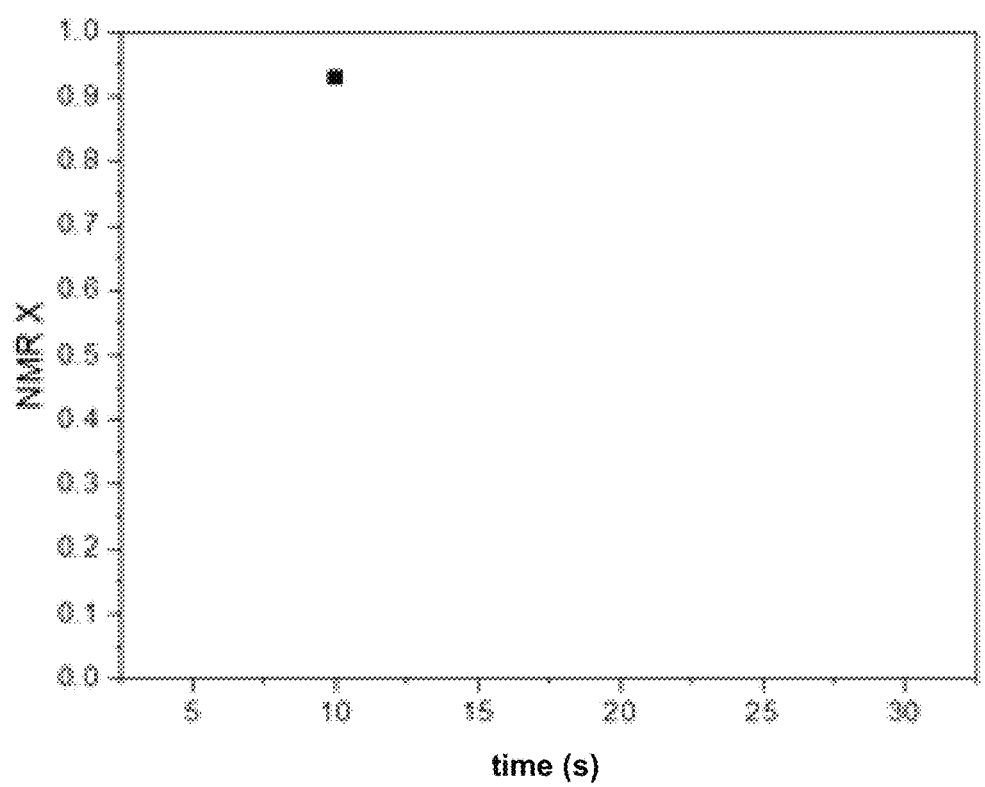

Under this concentration, we confirmed that Urea (1) and Urea (2) exhibit fast rates of polymerizations for VL, with complete conversion in less than 10 seconds in batch experiments, FIG. 6. Urea (2) was identified as a highly active catalyst for CL polymerization and VL/CL copolymerizations. We will utilize this reactivity for synthesizing biodegradable elastomeric particles, vide infra. Urea (3) suffered from a few disadvantages, including slower polymerization kinetics for both monomers and a lower solubility compared to the other catalysts. Table 3 summarizes the batch polymerization results. Once we identified Urea (1) or Urea (2) as potential catalysts for our system, we proceeded to design the microfluidic device.

Figure 2:
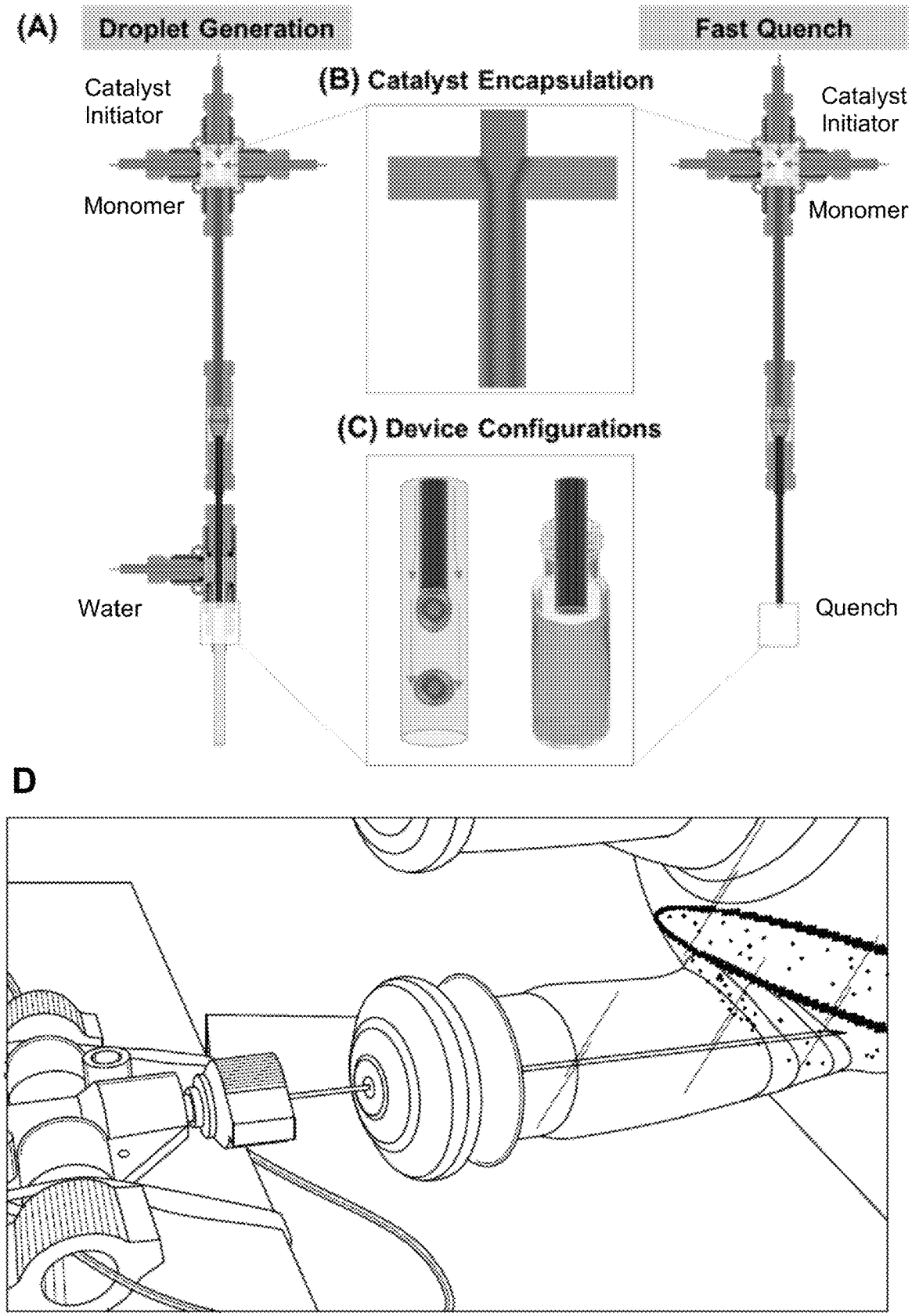
FIG. 2. (A) Droplet-generating microfluidic device made from commercially available components. (B) Catalyst encapsulation within two streams of monomer and organic solvent. (C) Droplet (left) and fast quench (right) configurations of the microfluidic device. (D) Microfluidic device in a laboratory setup.

Device Design. To perform the ROP in droplets dispersed in water, we implemented a microfluidic device that generates an oil-in-water (O/W) emulsion using a co-flow geometry reactor constructed with readily available components, FIG. 2a. By exploiting the unparalleled control over droplet size and encapsulation efficiency intrinsic to droplet-based microfluidics, we hypothesized that we could protect the ROP catalyst from water, thus temporarily sustaining catalyst activity in the presence of water.

The organic phase is comprised of two organic streams: the catalyst solution and the monomer solution. The two streams merge in a cross tee and flow through a hypodermic tube, which in turn is being dispersed in water. The choice of the cross tee, with two monomer streams surrounding the catalyst stream, at the inlet is deliberate, as it generates the first level of protection of the catalytic material. The inherent laminar flow of the fluid in the small diameter, short channel ensures that the catalyst remains primarily in the center of our organic phase before droplet formation when a sheath flow of water is introduced since mixing in the tube occurs only via diffusion, FIG. 2b.

Figure 7:
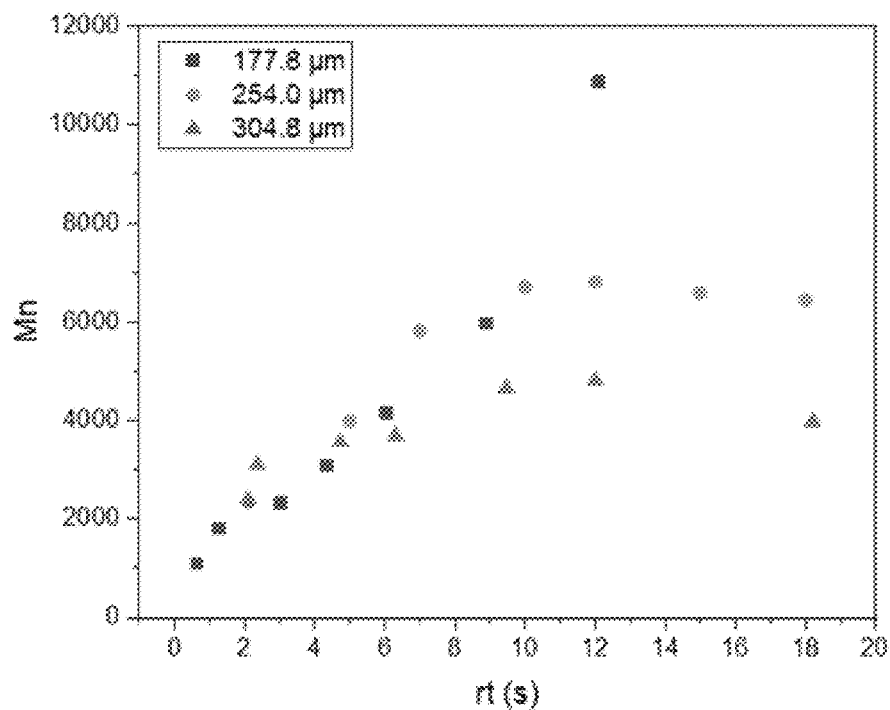
FIG. 7. Shows the effect of the diameter of the tubing after the cross tee on the molecular weight, polydispersity, and conversion of the polymer produced. Operating the device in the fast quench configuration. Catalyst is Urea (1), initiator is KOMe, and monomer is VL. Initator:Catalyst:Monomer 1:3:200. [Monomer]=3M. Quenching solution is acetic acid/THF.
Figure 8:
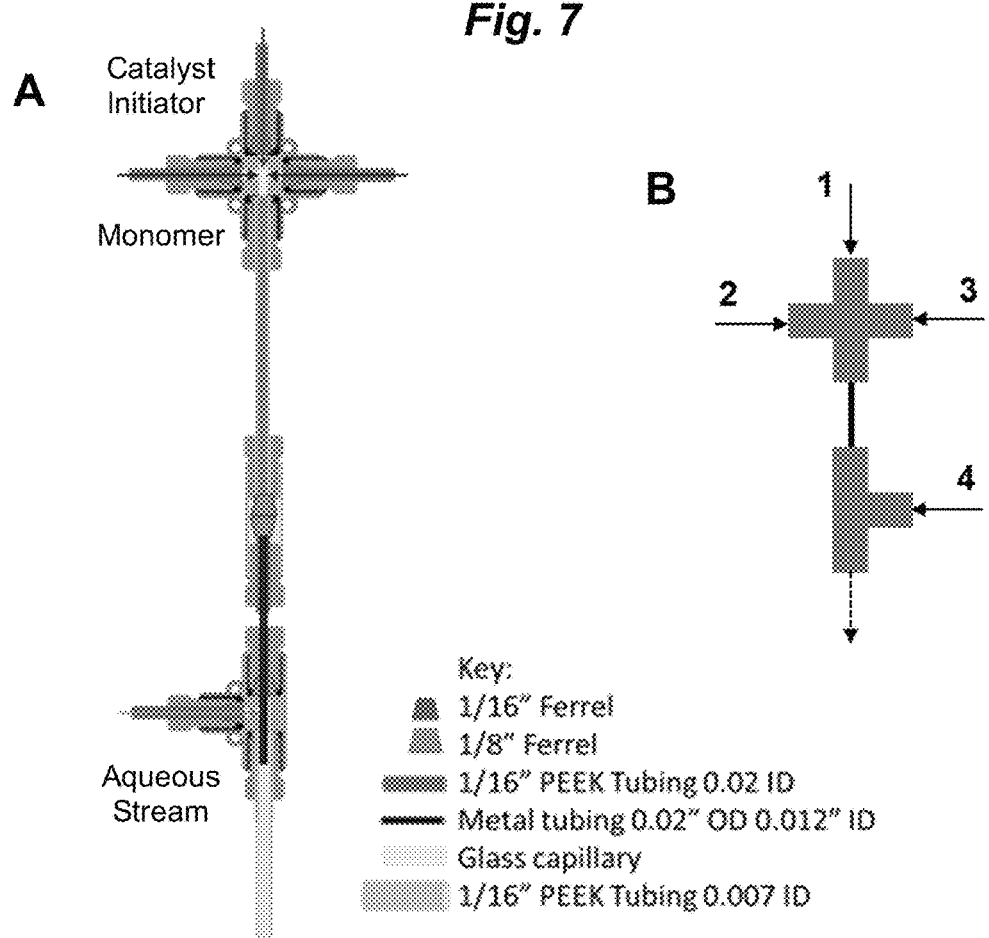
FIG. 8. (A) Droplet generating co-flow microfluidic device with all components listed. (B) Numbered inlets showing composition of reactants according to Table 4. (C) Other embodiments of the microfluidic device.
Figure 8:
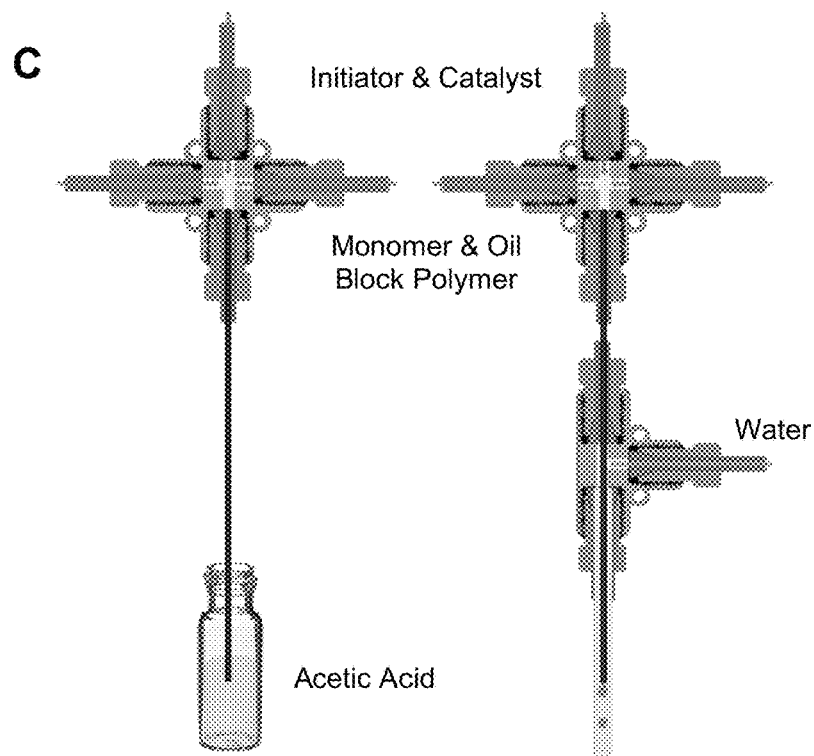

The diameter of the tubing after the cross tee plays a vital role in the molecular weight and dispersity of the polymer produced. Upon reducing the inner diameter of the tubing from 304.8 μm to 177.8 μm, the diffusion length decreases, which increases the homogeneity of the polymerization solution. In turn, this increase in homogeneity results in an increase in monomer conversion and molecular weight, and a decrease in dispersity, FIG. 7. Therefore, the final device design utilizes the smallest ID tubing (177.8 μm) for the organic phase to ensure control over the monomer conversion, molecular weight, and dispersity of the polymer generated. The organic phase expels in the center of a glass capillary tube, in which the continuous water phase is supplied through a secondary tee and shears the organic phase into droplets. FIG. 8 in the Supplemental Information provides a more detailed description.

The surface-area-to-volume ratio of the droplet is presumed to impact the polymerization time significantly. A smaller sized droplet has a shorter diffusion path to the core of the particle, which would result in a faster quenching of the catalyst. The organic phase outlet tip sets a lower limit for droplet diameter as the tip shields the growing droplet from the shear force of the continuous phase. Thus, we chose a sufficiently large diameter to produce 300 μm droplets. This microfluidic design comprised of "off-the-shelf" parts has a fixed reaction volume; thus the residence time (rt) can only be tuned by varying the flow rate.

To demonstrate that the polymerization proceeds in the aqueous phase after droplet formation, we must precisely determine the monomer conversion at the end of the organic phase outlet tip. Therefore, we ensured that we could operate our device in a second 'fast quench' configuration, where the tip of the organic phase outlet is exposed to a quenching solution of acetic acid and THF, FIG. 2c. After establishing the design of the microfluidic device, we then identified the appropriate formulation and flow rates to achieve excellent control over the size, shape, and homogeneity of the droplets and particles formed.

Figure 3:
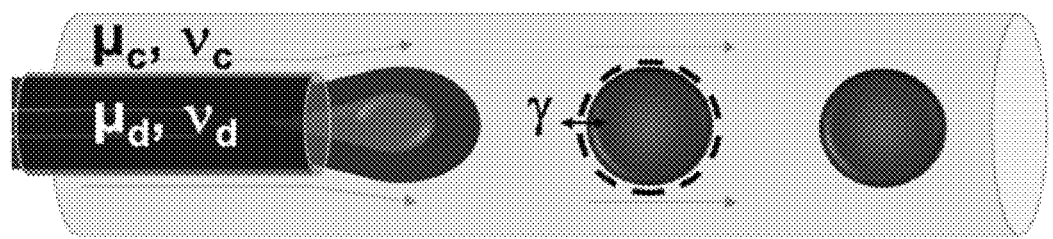
FIG. 3. Visual representation of the capillary number parameters and illustration of the (A) desired dripping regime and the (B) undesirable jetting regime.
Figure 3:
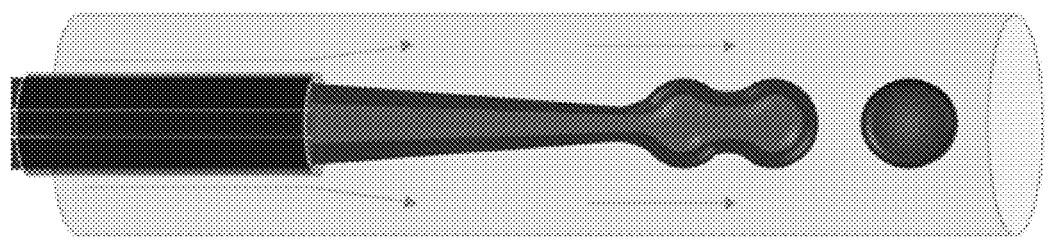

Droplet Formulation and Flow Rates. Three types of forces influence droplet generation in our system: viscous force, capillary force, and the dominating interfacial force. During droplet generation, the interface deforms significantly due to interfacial tension between the two phases, which results in necking, i.e., the interface fragmenting spontaneously and decaying into disconnected droplets. To determine droplet dynamics, such as fission or droplet break off, we leveraged the non-dimensionless capillary number (Ca), defined as Ca=$\mu v/\gamma$ (where $\mu$ is the viscosity of the phase of interest, $v$ is the velocity of the phase of interest, and $\gamma$ is the interfacial tension between the two phases), FIG. 3.

Figure 9:
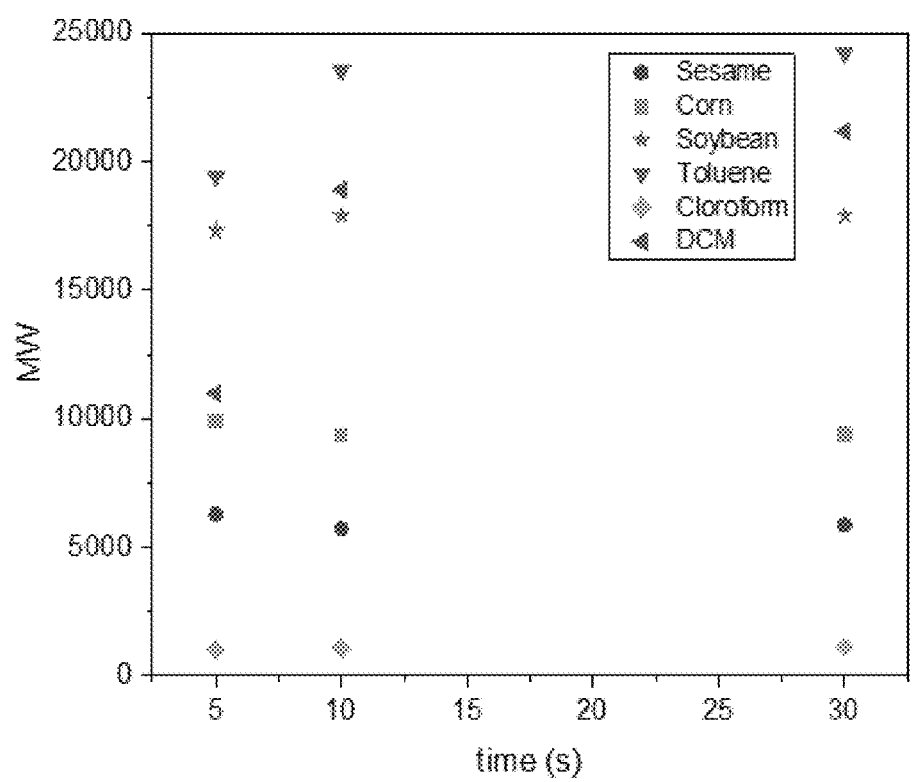
FIG. 9. Testing hydrophobic solvents' compatibility with ROP in batch. Room temperature. Stir plate at 800 rpm. Quenched with benzoic acid. Catalyst is Urea (1), initiator is KOMe, and monomer is VL. Initator:Catalyst:Monomer 1:3:200. [Monomer]=3M.

Droplet formation requires precise control of each of the parameters in the capillary number, especially the interfacial sension.62 The interfacial tension of our dispersed phase increases with increasing monomer consumption. At low conversion, the interface between the organic and aqueous phase is miscible, and the surface tension is low, both of which prevent droplet formation. Therefore, we explored hydrophobic solvents that improve the immiscibility of the two phases and expand the range of flow rates for droplet formation. The standard polymerization conditions used to identify a compatible solvent were a 1:3:200 ratio of [initiator]:[catalyst]:[monomer], with a VL monomer concentration of 3 mol $L^{-1}$. A series of batch polymerizations at room temperature identified toluene as a promising hydrophobic solvent, as it exhibited the fastest rate of living polymerization (full conversion within 10 seconds) and produced the highest molecular weight polymer (24 kg $mol^{-1}$) among all solvents tested, FIG. 9.

The two other parameters that affect the Ca are velocity and viscosity. Flow velocity is easily controlled in our system by varying the flow rate of both the dispersed and continuous phases. Reliable droplet generation at the organic phase outlet tip with the chosen formulations, the combined flow rate of the two organic phases could not exceed 140 μL/min, which corresponds to a lower limit for the rt of 5 s. The viscosity is a more complicated parameter to control since the viscosity of our dispersed phase is changing as a function of the rt. As the polymerization progresses, the viscosity ratio between our two phases (i.e., $\lambda=\mu dispersed/\mu continuous$) is greater than 1. Also prior work has shown that the viscous stress of the dispersed phase can impact droplet production since it is difficult for the continuous phase to fragment the dispersed phase.63,64 This viscous stress makes the dripping-to-jetting transition very sharp, and the only way to remain in the dripping regime is to keep the flow rate ratio of the dispersed to continuous phases (i.e., Q=Qdispersed/Qcontinuous) low, particularly below 0.5 for our device geometry.65,66 After careful selection of flow rates and formulation, we were able to produce uniform droplets in flow over a broad range of residence times (rt=5-21 s). We used these flow rates and the formulation to perform the ROP in the microfluidic device.

Figure 4:
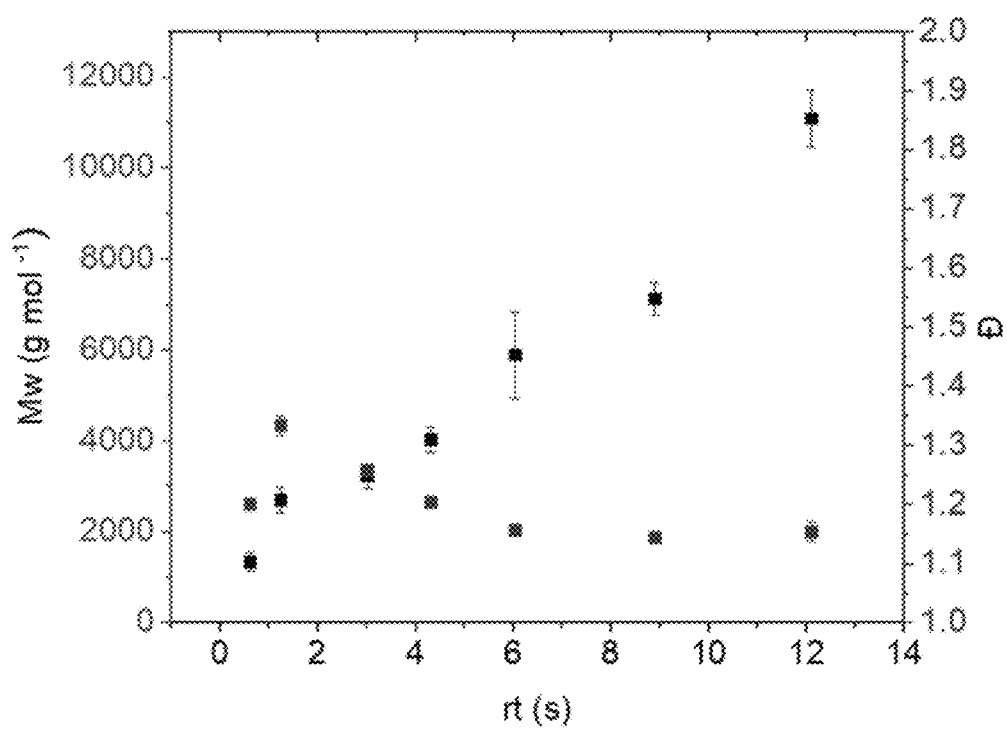
FIG. 4. Residence time ladder using the microfluidic device in the fast quench configuration with toluene as the hydrophobic solvent. Reaction conditions: [KOMe]:[urea]:[monomer]=1:3:200 and $[monomer]_0$=3 M in THF at room temperature. $M_w$ and Đ determined by PS calibrated GPC in THF.

ROP in Fast Quench Configuration. Before determining how much, if any, polymerization occurred in the dispersed droplet, we precisely determined the conversion at the end of the organic phase outlet tip. To do so, we operated the device in the 'Fast Quench' configuration, which allowed us to build a rt versus conversion ladder, FIG. 4.

Figure 10:
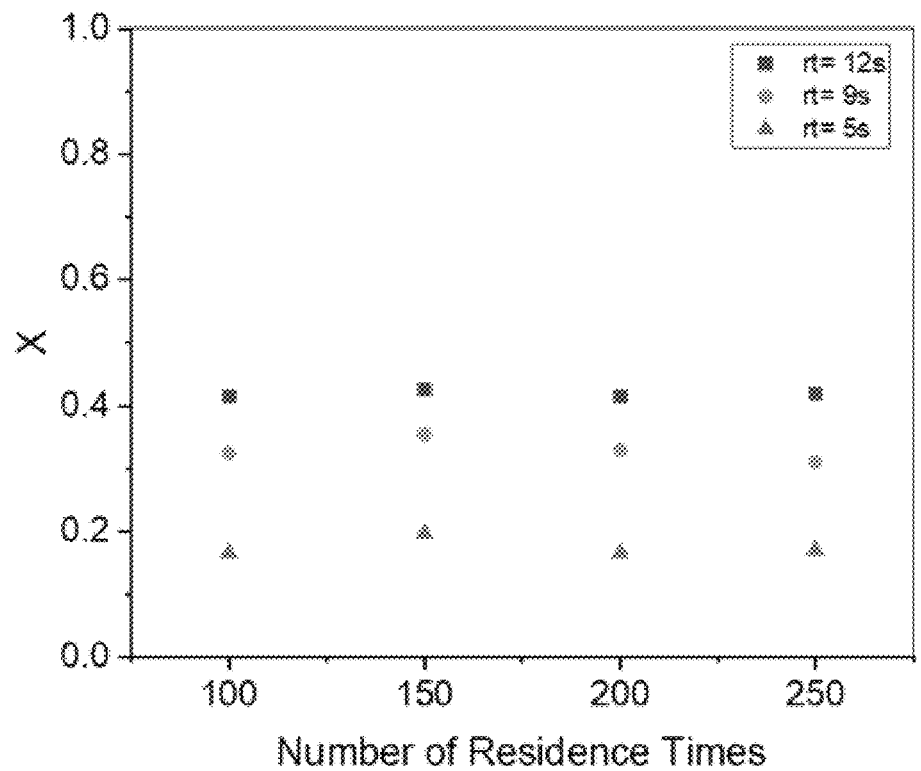
FIG. 10. Stability study of the polymerization of VL by Urea (1) over 250 residence times for three flow rates within the flow device. Quenched with acetic acid/THF. Catalyst is Urea (1), initiator is KOMe, and monomer is VL. Initator:Catalyst:Monomer 1:3:200. [Monomer]=3M.

The molecular weight increases with rt, reaching 10 kg/mol and a conversion of 50% for a rt of 12 seconds. The process was stable, as illustrated by the constant conversion achieved for different flow rates over hundreds of residence times, FIG. 10. Compared to the batch polymerization, which reaches 100% conversion after 5 s, polymerization in the flow device is significantly slower. Additionally, the molecular weight increases linearly with rt, which differs from batch experiments, FIG. 6. Both observations are indicative of the inhomogeneity of the reaction mixture in the tubular reactor. In our flow device, the monomer and catalyst streams are relying exclusively on diffusion to mix. The heterogeneous reaction is diffusion controlled, as the catalyst and initiator solution in the center of the stream is poorly soluble in the surrounding toluene and monomer. The poor solubility further slows down the homogenization of the solutions and thus the polymerization. While this difference in solubility and slow diffusion hampers polymerization, this difference aids in isolating the catalyst to the center of the droplets, thus delaying quenching by water.

ROP in Droplet Configuration. Using the same formulation and flow rates as in the fast quench configuration, we performed the ROP in the droplet configuration. By design, we want to keep the monomer conversion low within the microfluidic device to maintain a low enough viscosity of the polymer solution to allow flow through the device without clogging; therefore, we aimed for a rt less than 30 seconds. While continuing to keep the flow rate ratio less than 0.2, flow rates enabling the formation of the droplets were extremely small. The total dispersed phase flow rate had to stay below 100 μL/min (or a rt greater than 10 s) to obtain consistent droplet formation. At dispersed flow rates greater than 100 μL/min, the dispersed phase shifts into a jetting regime near the hypodermic needle tip before experiencing Rayleigh-Plateau instability and eventually forming droplets downstream, FIG. 3b. The molecular weight of the polymer obtained in this jetting regime was similar to the one obtained in the fast quench experiment at identical flow rates, Table 2. We attributed this negative result to the jetting regime exposing more surface area to the aqueous phase before droplet formation, leading to faster quenching of the polymerization.

TABLE 2

Comparison of droplet reactor polymerization performance

| Entry | Configuration | Water | Time (s) | X (%)$^a$ | $M_{n,\,theor}$ (g mol$^{-1}$) | $M_w^b$ (g mol$^{-1}$) | $Đ^b$ |
|---|---|---|---|---|---|---|---|
| 1 | Batch | — | 10 | 90 | 18,000 | 20,700 | 1.2 |
| 2 | Batch | +100 eq | 120 | 0 | 0 | 0 | — |
| 3 | Fast quench | No | 10 | 26 | 5,200 | 7,700 | 1.3 |
| 4 | Droplet jetting to dripping regime | Yes | 10 | 27 | 5,400 | 7,900 | 1.3 |
| 5$^c$ | Droplet dripping regime with surfactant | Yes | 10 | 55 | 11,000 | 13,800 | 1.6 |
| 6$^d$ | Droplet dripping regime with crosslinker | Yes | 10 | N/A | N/A | 45,200 | 2.4 |

Reaction conditions: [KOMe]:[urea]:[monomer] = 1:3:200 and [monomer] 0 = 3M in THF at room temperature. All batch reactions performed under anhydrous conditions and quenched with benzoic acid.
$^a$Conversion determined by 1H NMR.
$^b$Mw and PDI determined by PS calibrated GPC in THF.
$^c$Tergitol 1% added to the continuous water phase.
$^d$BCP crosslinker 0.5% added to the monomer streams.

As mentioned earlier, the flow regime is directly related to the capillary number. The viscosity parameter is dependent on the velocity parameter as the flow rate of the solution, in conjunction with the polymerization rate, determines the viscosity of the solution. Therefore, we focused our attention on the difference in interfacial tension between the two streams. We hypothesized that we could extend the flow rates that produced the desired dripping regime by adding a surfactant in the aqueous phase. Indeed, in the presence of 1% of Tergitol in the aqueous phase, the droplet break-off at the hypodermic needle tip was sharp and consistent across a broad set of residence time (5-21 seconds). In the presence of a surfactant, the polymer formed in the droplet reached a molecular weight and conversion double that of the fast quench set-up. The clear difference in molecular weight of the polymer formed between the droplet regime and the fast quench demonstrates that polymerization proceeds in the droplet, Table 2, entry 5.

Figure 5:
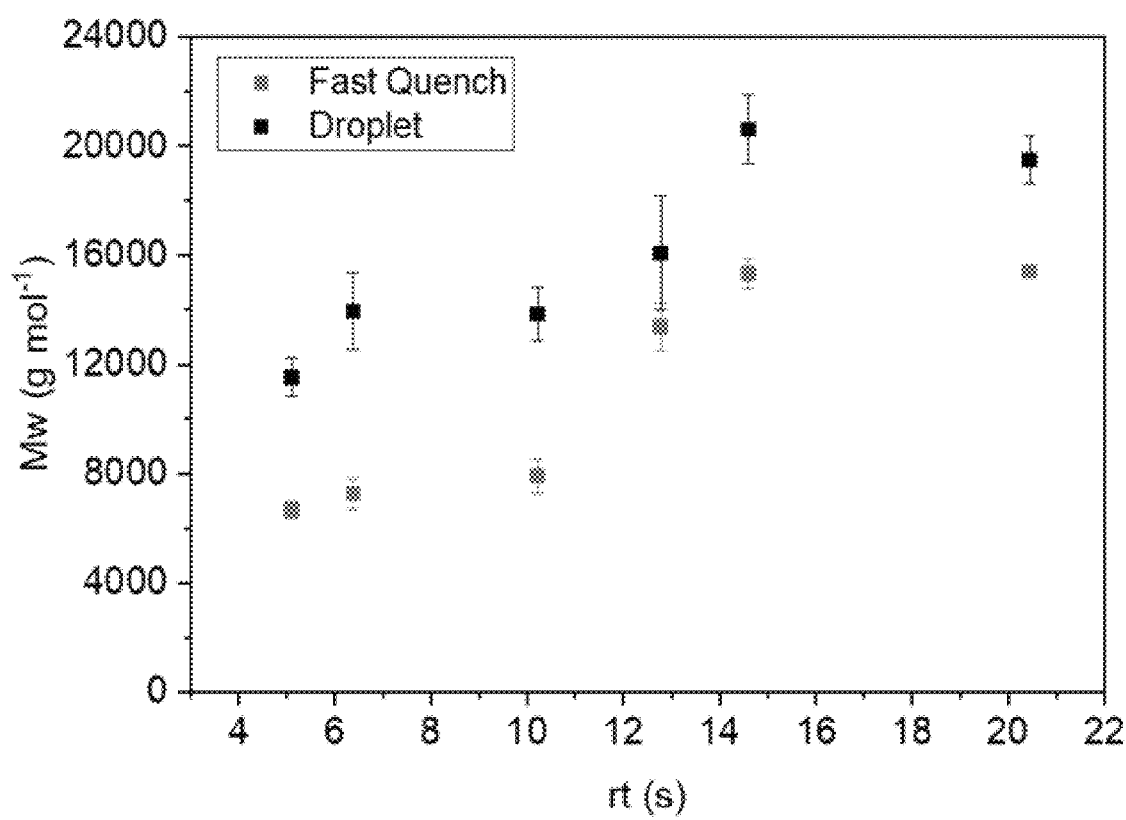
FIG. 5. Comparison between the molecular weight of polymer produced using the fast quench and droplet generation configuration Reaction conditions: [KOMe]:[urea]:[monomer]=1:3:200 and $[monomer]_0$=3 M in THF at room temperature. $M_w$ determined by PS calibrated GPC in THF. Fast quench configuration: quenching solution is acetic acid. Droplet generation configuration: Tergitol 1% added to the continuous water phase.
Figure 11:
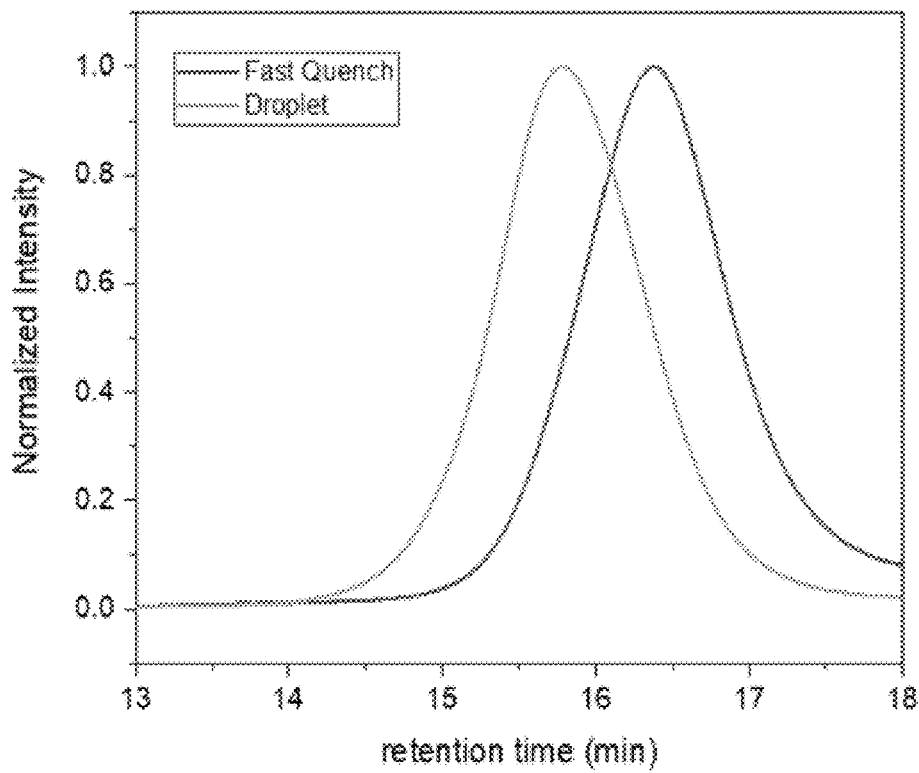
FIG. 11. GPC comparison between the fast quench configuration and the droplet configuration (rt=12.7 s).

Interestingly, the dispersity of the polymer obtained in the droplet configuration is broader than in any other set-up with an asymmetrical distribution skewed towards lower molecular weight, FIG. 11. This asymmetrical distribution is consistent with the absence of chain transfer and the slow quenching of the polymerization caused by the diffusion of water, further validating that the polymerization proceeded in the droplet. We confirmed this result by performing a systematic study where the molecular weight of the polymer synthesized at several residence times was compared between the fast quench and droplet configuration. At each tested rt, the droplet encapsulation technique produced higher molecular weight polymers compared to fast quench, FIG. 5. This higher molecular weight demonstrates, for the first time, successful ring-opening polymerization of biodegradable cyclic esters in an aqueous dispersion.

To demonstrate the benefit of performing a ROP in dispersion, we aimed to synthesize biodegradable elastomer particles by introducing a crosslinking monomer within the dispersed phase. We chose bis(e-caprolactone-4-yl)propane (BCP), because this crosslinker is compatible with the urea organocatalyzed ROP. We maintained the polymerization conditions used above, but the catalyst was switched from Urea 1 to Urea 2 to allow for the copolymerization of the VL monomer with the CL based crosslinker. Slight modifications to the device were made to prevent increased pressure and potential clogging from the higher viscosity of the crosslinked polymer solution, refer to FIG. 8c for more details. The addition of a 0.5% loading of BCP led to a dramatic increase in molecular weight to 45.2 kg mol$^{-1}$ in 10 seconds, Table 2 entry 6. The dispersity of the resulting polymer simultaneously increased to 2.4, consistent with the presence of crosslinking.

Figure 12:
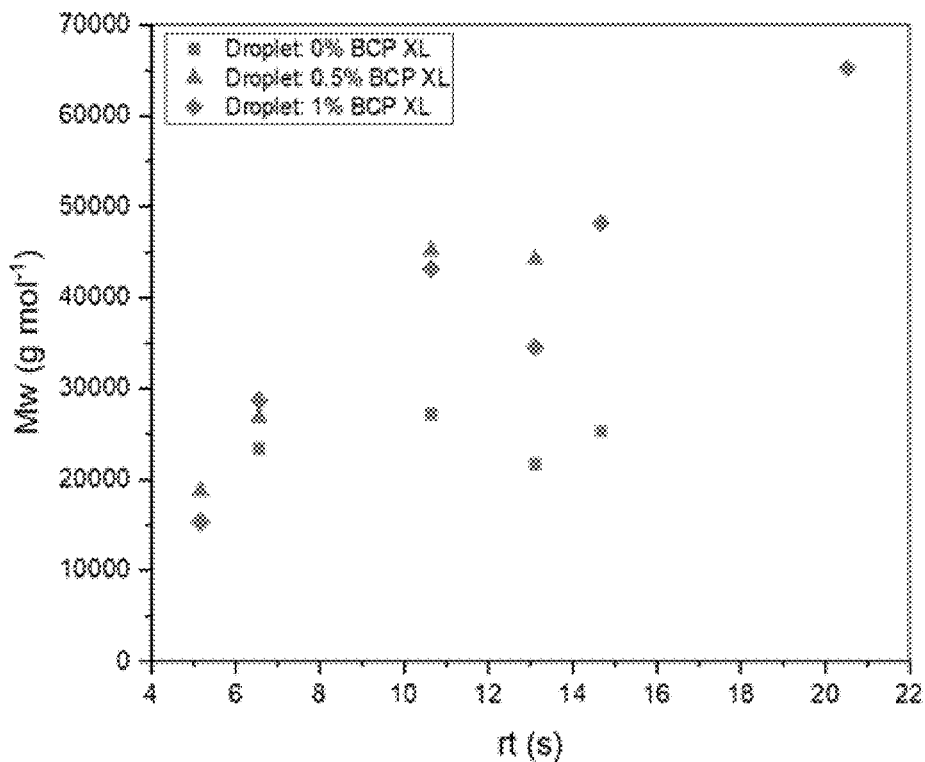
FIG. 12. Comparison between droplets containing 0, 0.5, and 1% BCP crosslinker. Catalyst is Urea (1), initiator is KOMe, and monomer is VL. Initator:Catalyst:Monomer 1:3:200. [Monomer]=3M.
Figure 13:
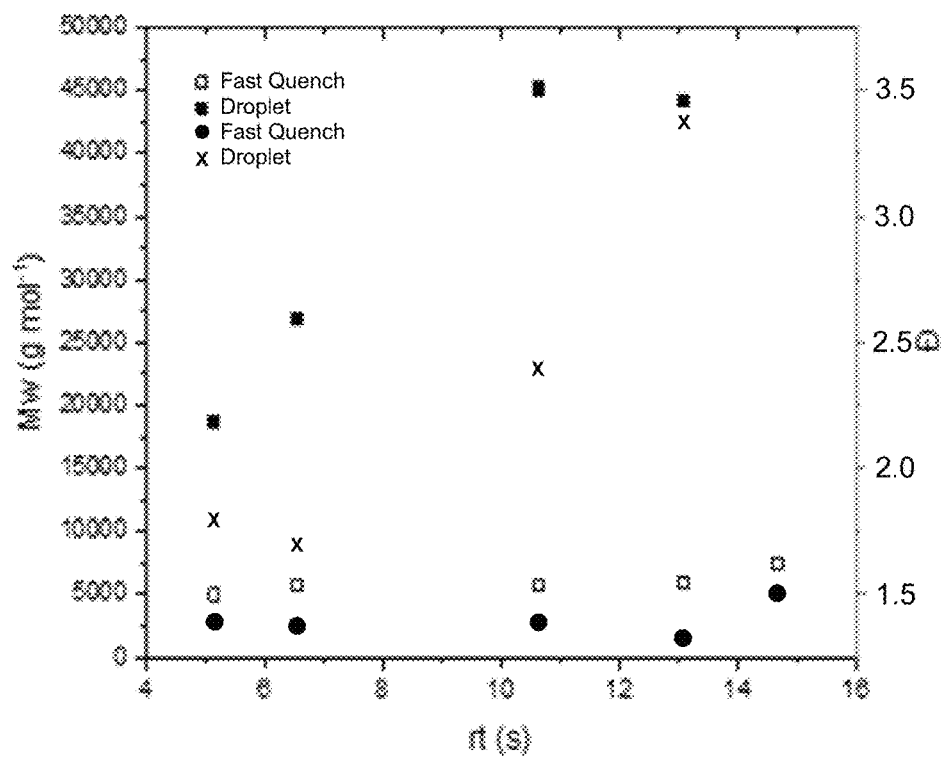
FIG. 13. Molecular weight and dispersity of 0.5% BCP crosslinked droplets over a range of residence times for both the fast quench and the droplet polymerizations. Catalyst is Urea (1), initiator is KOMe, and monomer is VL. Initator:Catalyst:Monomer 1:3:200. [Monomer]=3M. Fast quench quenching solution was acetic acid/THF.

When comparing the fast quench to droplet configuration for a range of rt between 5-13 seconds, the polymer obtained from the droplet polymerizations showed higher molecular weight for every flow rate tested, FIG. 13. After increasing the loading of the BCP to 1% we produced crosslinked particles with a molecular weight of 65.3 kg mol$^{-1}$ and a dispersity of 2.6, FIG. 12. The crosslinked polymer droplets still contained the hydrophobic solvent, toluene, and therefore were not robust solid particles. The addition of methanol to the collection vessel allowed the toluene to diffuse out of the droplets into the aqueous phase, in turn, creating solid particles. Through the introduction of the crosslinker BCP, we were able to expand the use of the encapsulation technique to produce crosslinked biodegradable materials in flow.

Conclusions. With the development of this encapsulation technique for water sensitive ring-opening polymerization catalysts, we have demonstrated, for the first time, ROP in an aqueous dispersion, as well as the generation of crosslinked biodegradable elastomer droplets in flow. Through device design and understanding of fluid mechanics, we were able to encapsulate the water-sensitive urea organocatalysts in between monomer and hydrophobic solvent. The heterogeneous polymerization protected the urea catalyst from the aqueous phase, allowing polymerization to proceed while in the aqueous phase. The droplet ROP encapsulation was able to produce a maximum molecular weight of 20.6 kg mol$^{-1}$ compared to the fast quench configuration maximum of 15.3 kg mol$^{-1}$. This encapsulation technique offers a wide variety of tunability of the polymer particles produced. To illustrate this, we introduced a crosslinking monomer into the formulation to produce biodegradable elastomer particles. The molecular weight of the resulting elastomer droplets reached a maximum of 65.3 kg mol$^{-1}$ with a dispersity of 2.6, confirming that crosslinking had occurred. These particles can then be isolated and processed similarly to non-biodegradable coagulated latex (e.g., styrene butadiene rubber and natural rubber), offering a sustainable alternative to the accumulation of non-biodegradable thermoset based object in our landfills. Further work into the functionalization of these particles for more advanced applications could further a diverse field of research, including coatings, drug delivery, and biomedical applications.

EXAMPLES

Example 1. Materials and Methods

Materials: The monomers of interest δ-valerolactone (VL) and ε-caprolactone (CL), 1,3 diphenylurea Urea (1), and reactants for the synthesis of Urea (2) and Urea (3) including cyclohexyl isocyanate, aniline, phenyl isocyanate, and N-methylcyclohexyl amine were purchased from Sigma Aldrich. All necessary solvents and Tergitol™ (surfactant/stabilizing agent) were also purchased from Sigma Aldrich.

General procedure for solution preparation and storage: Care was taken for monomer preparation to ensure that monomer solutions were free of impurities and dry. δ-valerolactone (VL) was distilled and stored at 4° C. under anhydrous conditions. ε-caprolactone (CL) was distilled and stored over sieves for 24 hours before use under anhydrous conditions. All catalyst, preparation materials (syringes, vials, needles, etc.), and solvents (THF and toluene) were dried and stored under anhydrous conditions. All batch polymerizations were performed inside the glovebox, while all subsequent fast quench, and droplet generation experiments the solutions were prepared inside the glovebox, loaded onto the appropriate glass syringes, and the capped syringes were brought out of the glovebox and attached to the microfluidic device.

General procedure for batch testing urea organocatalysts ring-opening polymerization of cyclic esters: The primary constraint for the success of the project is the selection of a catalyst system with a high rate of polymerization. Urea organocatalysts were chosen as the catalysts of interest because they exhibit fast polymerization kinetics for the ring-opening polymerization of cyclic esters, specifically our monomers of interest, δ-valerolactone (VL) and ε-caprolactone (CL). With a wide variety of urea catalysts to choose from, we focused on testing three ureas that have been previously reported to reach full conversion in under 10 seconds. We tested commercially available 1,3-diphenylurea (Urea (1)) as well as two ureas we prepared by reacting the corresponding isocyanates and amines for 3-cyclohexyl-1-phenylurea (Urea (2)) and 3-cyclohexyl-3-methyl-1-phenylurea (Urea (3); J. Am. Chem. Soc. 2017, 139, 15407).

To probe the polymerization behavior under our formulation requirements we ran a series of batch polymerizations, Table 3. All solutions were prepared under anhydrous conditions (glove box) and the results showed that all three ureas polymerized VL in under 10 seconds, while Urea (2) and Urea (3) were able to polymerize CL in under 30 seconds. At high conversion Urea (2) and Urea (3) were shown to produce polymers with a larger dispersity, therefore we chose to move forward with Urea (1) as our catalyst of interest for the remainder of the study. Having a catalyst system that is able to produce well defined polymers would allow us to better analyze any adverse effects of the flow system and subsequently the exposure to water.

Urea (1) and VL were chosen for subsequent reactions because the polymerization reached full conversion in under 10 seconds and produced the narrowest dispersity polymer, FIG. 6. Having fine control over the polymer produced allows us to better see any increase in polymerization during droplet formation in the aqueous dispersion.

TABLE 3

Results from testing three urea organocatalyst with hydrophobic solvent

| Entry | Monomer | Catalyst | Catalyst/initiator | Time (s) | X (%) | $M_{n, theoretical}$ (g*mol$^{-1}$) | $M_n$ (g*mol$^{-1}$) | PDI |
|---|---|---|---|---|---|---|---|---|
| 1 | VL | Urea (1) | 3 | <10 | >90 | 18,000 | 16700 | 1.12 |
| 2 | CL | Urea (1) | 3 | 10 | 5 | 1,050 | 1200 | 1.13 |
| 3 | VL | Urea (2) | 3 | <5 | >90 | 18,000 | 19900 | 1.43 |
| 4 | CL | Urea (2) | 3 | 30 | >90 | 18,900 | 18000 | 1.21 |
| 5 | VL | Urea (3) | 4 | <10 | >90 | 18,000 | 20000 | 1.45 |
| 6 | CL | Urea (3) | 4 | 30 | 72 | 15,100 | 16300 | 1.23 |

Conversion calculated via 1H NMR, molecular weight/PDI reported via GPC against polystyrene standards. Room temperature. Stir plate at 800 rpm. Quenched with benzoic acid. Catalyst solvent is tetrahydrofuran and solvent for monomer solution is toluene. [Monomer]=2M. [Initiator (KOMe)]:[Monomer] [1]:[200].

Diameter of tubing effect on molecular weight and conversion: The choice of tubing diameter after the cross tee plays an important role in the mixing via diffusion between the catalyst/initiator and monomer streams. As we decreased the inner tubing diameter from 304.8 μm to 177.8 μm we saw a linear increase in MW with residence time, FIG. 7. The smaller ID decreases the diffusion distance and therefore increases the homogenization between the two organic streams. Therefore, moving forward the design implemented a 177.8 μm ID tubing after the cross tee.

Device design materials and assembly specifications: The microfluidic device utilized is made from all commercially available components. FIG. 8 shows a cross-section of both intersecting flow points at each end of the co-flow droplet generating microreactor. The microreactor consists of one PEEK 0.02" thru hole cross assembly and one PEEK 0.02" thru hole tee fitting purchased from IDEX Health & Science. Input flow was supplied by three syringe pumps with glass syringes connected to 1/16" OD, 0.02" (177.8 μm) ID PEEK tubing, which was also purchased from IDEX. Connecting the two fittings is a 3" piece of 25G thin wall stainless steel hypodermic tubing with a 0.02 OD, 0.012 ID purchased from Component Supply. One end of the metal tubing was inserted into a piece of the 1/16" PEEK tubing to seal an end on both fittings, while the other end of the metal tubing was entirely threaded through the tee. The glass capillary was inserted into 1/8" PEEK tubing and positioned at the opposite end of the tee. This allowed enough space for the water to flow through the gap around the metal tubing to shear off the droplets. Table 4 shows an example of the components being streamed into the microfluidic device (FIG. 8b).

TABLE 4

Composition of inlet streams

| Stream | Components |
|---|---|
| 1 | Initiator: K-Octanol or KOMe<br>Catalyst: 1,3 diphenyl urea<br>Solvent: THF |
| 2, 3 | Monomer: δ-Valerolactone<br>Oil: Soybean oil<br>Solvent: Toluene |
| 4 | Water |

Testing hydrophobic solvents: At such a small scale, the effects of surface forces are significantly greater than other forces that the droplet will experience, such as the viscous force. Shearing by dominating interfacial tension force is advantageous for continuous and stable formation of monodispersed droplets. The interfacial tension between the two phases (γ) is a set value depending on the composition of the two phases. To tune the interfacial tension between the two phases, we analyzed the compatibility of different solvents with the ROP chemistry, FIG. 9.

We started by looking at two different classes of hydrophobic solvents: biobased oils and organic solvents. The biobased oils of interest were sesame, corn, and soybean. The polymerization within all three of these oils reached full conversion within 5 seconds, but the molecular weight of the polymer produced varied drastically. Corn and soybean oil produced higher molecular weight than the sesame oil, 10 k and 17 k, respectively. However, the soybean oil was the only oil that produced a monophasic product with the polymer. The organic solvents of interest were toluene, chloroform, and DCM. Toluene and DCM yielded the highest molecular weight, 24K and 20K, respectively. However, toluene had a significantly faster rate than the other two organic solvents. After analyzing the six hydrophobic solvents in batch polymerizations, we toluene as our hydrophobic solvent.

Stability of urea catalyst activity during flow: In order to determine if the chemistry is affected by the inhomogeneity in the flow device, we ran stability studies at three different flow rates for multiple residence times in the fast quench configuration with toluene as the hydrophobic solvent. We observed that the polymer conversion remained consistent at all three flow rates for over 250 residence times, showing that the chemistry within the device is stable and reproducible, FIG. 10.

Increase in dispersity for droplet generation over fast quench analysis: Interestingly when comparing the fast quench configuration samples to their droplet configuration counterparts we saw an increase in dispersity in the polymer produced after droplet formation. FIG. 11 gives an example of a sample collected during fast quench versus a sample collected during droplet formation at the same residence time. One can see the increase in dispersity for the droplet configuration and a slight tailing towards the lower molecular weight. This tailing can be explained by the initiation of small polymer chains by the water after droplet formation, and non-homogenous quenching of the catalyst within the particle due to water diffusion.

Droplet Collection for analysis: In order to collect the droplets for GPC and NMR analysis we utilized glass GPC vial inserts (Thermo-Fisher). The glass vial insert was placed at the end of the glass capillary outlet and the droplets were collected for subsequent analysis.

BCP Crosslinked Droplets: The bis(e-caprolactone-4-yl) propane (BCP) was synthesized following previously reported methods (Soft Matter 2007, 3, 1335; J. Control. Release 1984, 1, 3).

Device design modification: Small modifications were made to the droplet generating microfluidic device to allow the implementation a crosslinker into the ROP chemistry. We knew the viscosity of the solution was going to increase within the device due to the crosslinking chemistry. By removing the smaller diameter tubing (1/16" OD 0.007" ID) we could remove the area of the device most prone to pressure buildup and subsequent clogging. In the new design, FIG. 8c, the metal hypodermic tubing is attached directly to the cross tee and fed through the subsequent tee that supplies the continuous water phase. Lastly, the length of the hypodermic tubing was increased from 3" to 4" to keep the overall reaction volume and the previously used residence times consistent.

BCP polymerization results in flow: With the new device design, we ran three trials with varying amounts of BCP crosslinker, 0, 0.5, and 1%. The droplets were collected in a vial containing 50:50 ratio of water to methanol, allowing the toluene to diffuse out into the aqueous phase and therefore solidifying the droplets. After collection, the droplets were left in solution until they sank to the bottom of the vial (indicating the removal of toluene). Next, the particles were dissolved in THF with vigorous shaking for 10 minutes. The solution was then filtered through 0.45 um filters to remove insoluble crosslinked polymer that could damage the GPC column. The results showed a significant increase in molecular weight and dispersity for the polymer produced with the 0.5 and 1% BCP crosslinker over the control with no crosslinker present. However, there was not much difference in the molecular weight between the 0.5 and 1% trials, FIG. 12.

Looking specifically at the 0.5% loading of BCP crosslinker, we confirmed that the increase in molecular weight and crosslinking occurred while the droplet was in the aqueous phase, by operating the device in the fast quench configuration and comparing the two results, FIG. 13. The drastic increase in both molecular weight and dispersity is indicative of the ROP and crosslinking within the droplets.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:
1. A droplet microreactor comprising:
a) an amphiphilic molecule;
b) a hydrophobic carrier comprising a mono-lactone monomer and an oil, nonpolar solvent, or combination thereof; and c) an anhydrous homogenous solution comprising a polymerization catalyst, an alkoxide initiator, and a polar aprotic solvent;
wherein the amphiphilic molecule and the hydrophobic carrier form a droplet microreactor having a hydrophobic interior and a hydrophilic exterior;
wherein the hydrophobic interior of the droplet microreactor comprises the anhydrous homogeneous solution and the hydrophilic exterior is ensheathed in an aqueous solution.

2. The microreactor of claim 1 wherein the microreactor further comprises a cross-linking monomer.

3. The microreactor of claim 2 wherein the cross-linking monomer is a bis-lactone monomer.

4. The microreactor of claim 1 wherein the polymerization catalyst is an organic ring-opening polymerization anion catalyst comprising a urea moiety.

5. The microreactor of claim 1 wherein the initiator is a potassium alkoxide.

6. The microreactor of claim 1 wherein the polar aprotic solvent is an ether.

7. The microreactor of claim 1 wherein the diameter of the microreactor is about 10 nanometers to about 500 micrometers.

8. The microreactor of claim 1 further comprising channels extending from the hydrophobic interior to the hydrophilic exterior of the microreactor.

9. The microreactor of claim 8 wherein the channels have a diameter sufficiently wide for the mono-lactone monomer to traverse through the channels, wherein the mono-lactone monomer has a molecular weight of less than 200 Daltons.

10. A system for forming the droplet microreactor according to claim 1 comprising:
a) the amphiphilic molecule;
b) the hydrophobic carrier comprising the mono-lactone monomer and the oil, nonpolar solvent, or combination thereof;
c) the anhydrous homogenous solution comprising the polymerization catalyst, alkoxide initiator, and polar aprotic solvent; and
d) a microfluidic device configured for laminar flow of a fluid comprising the anhydrous homogeneous solution and of a mixture of the amphiphilic molecule and the hydrophobic carrier, wherein the anhydrous homogenous solution flows coaxially at the center of the mixture;
wherein the microfluidic device comprises an inlet for a stream of an aqueous solution that ensheaths the fluid and forms uniform microdroplets of the droplet microreactor.

11. The system of claim 10 wherein the microreactor further comprises a cross-linking monomer.

12. The system of claim 10 wherein the microfluidic device comprises flow control valves capable of individually controlling laminar flow velocity of the mixture, anhydrous homogenous solution, and aqueous solution.

13. The system of claim 10 wherein the microfluidic device comprises a tube for laminar flow of the fluid wherein the tube has a diameter suitable for forming uniform microdroplets of the droplet microreactor.

14. A method for ring-opening polymerization (ROP) comprising:
a) contacting an amphiphilic molecule, a mono-lactone monomer capable of ring-opening polymerization, and a hydrophobic carrier to form a mixture;
b) contacting an organic polymerization catalyst, an alkoxide initiator, and a polar aprotic solvent to form an anhydrous homogeneous solution;
c) feeding the anhydrous homogeneous solution into at least one first inlet of a microfluidic device and feeding the mixture into at least one second inlet of the microfluidic device wherein the microfluidic device is configured for laminar flow of a fluid, the fluid comprising the anhydrous homogeneous solution fed from the at least one first inlet and the mixture fed from the at least one second inlet, wherein the anhydrous homogenous solution flows coaxially at the center of the mixture; and
d) forming a stream of an aqueous solution from at least one third inlet of the microfluidic device wherein the aqueous solution ensheaths the fluid to form uniform microdroplets of a droplet microreactor;
wherein the amphiphilic molecule and the hydrophobic carrier form the droplet microreactor having a hydrophobic interior and a hydrophilic exterior;
wherein the hydrophobic interior of the droplet microreactor comprises the anhydrous homogeneous solution and the hydrophilic exterior is ensheathed in the aqueous solution;
wherein the mono-lactone monomer diffuses into the anhydrous homogeneous solution at the hydrophobic interior of the droplet microreactor to form a polymer via ROP.

15. The system of claim 14 wherein the microfluidic device comprises a tube for laminar flow of the fluid wherein the tube has a diameter suitable for forming uniform microdroplets of the droplet microreactor.

16. The method of claim 14 wherein the hydrophobic carrier comprises an oil, nonpolar solvent, or combination thereof.

17. The method of claim 14 wherein the mono-lactone monomer diffuses into the anhydrous homogeneous solution at a rate faster than the aqueous solution.

18. The method of claim 14 wherein the aqueous solution diffuses into the anhydrous homogeneous solution at a rate slower than the rate of ROP.

19. The method of claim 14 wherein the anhydrous homogeneous solution, mixture, and aqueous solution each have a flow rate that can be individually varied via a control valve to change the diameter of the uniform microdroplets, the molecular weight of the latex, or a combination thereof.

20. The method of claim 14 wherein the fluid has a first flow rate (fr) and the aqueous solution has a second flow rate (ar) and the ratio fr:ar is about 1:3 to about 1:5.

21. The method of claim 14 wherein the microreactor further comprises a crosslinking bis-lactone monomer.

22. The method of claim 21 wherein the formed latex is a biodegradable elastomer.

23. A droplet microreactor comprising:
a) an amphiphilic molecule;
b) a hydrophobic carrier comprising a mono-lactone monomer, a cross-linking monomer, and an oil, nonpolar solvent, or combination thereof; and
c) an anhydrous homogenous solution comprising a polymerization catalyst, an alkoxide initiator, and a polar aprotic solvent; and
d) an aqueous solution;
wherein the amphiphilic molecule and the hydrophobic carrier form a droplet microreactor having a hydrophobic interior and a hydrophilic exterior;

wherein the hydrophobic interior of the droplet microreactor comprises the anhydrous homogeneous solution and the hydrophilic exterior is ensheathed in the aqueous solution.

24. A droplet microreactor comprising:
a) an amphiphilic molecule;
b) a hydrophobic carrier comprising a mono-lactone monomer and an oil, nonpolar solvent, or combination thereof; and
c) an anhydrous homogenous solution comprising a polymerization catalyst, an alkoxide initiator, and a polar aprotic solvent; and
d) an aqueous solution;
wherein the amphiphilic molecule and the hydrophobic carrier form a droplet microreactor having a hydrophobic interior and a hydrophilic exterior, and the diameter of the droplet microreactor is about 10 nanometers to about 500 micrometers;
wherein the hydrophobic interior of the droplet microreactor comprises the anhydrous homogeneous solution and the hydrophilic exterior is ensheathed in the aqueous solution.

\* \* \* \* \*